US011873922B2

(12) United States Patent
Clune et al.

(10) Patent No.: US 11,873,922 B2
(45) Date of Patent: Jan. 16, 2024

(54) TRACER WIRE HOLDER

(71) Applicant: Tracer Way Inc., Barrie (CA)

(72) Inventors: Jordon Clune, Barrie (CA); Andrew Bird, Oro-Medonte (CA); Robert Meeuwse, Oro-Medonte (CA); Brett Molnar, Toronto (CA)

(73) Assignee: Tracer Way Inc., Barrie (CA)

( * ) Notice: Subject to any disclaimer, the term of this patent is extended or adjusted under 35 U.S.C. 154(b) by 0 days.

(21) Appl. No.: 18/015,497

(22) PCT Filed: Jul. 8, 2021

(86) PCT No.: PCT/CA2021/050936
§ 371 (c)(1),
(2) Date: Jan. 10, 2023

(87) PCT Pub. No.: WO2022/011453
PCT Pub. Date: Jan. 20, 2022

(65) Prior Publication Data
US 2023/0194020 A1    Jun. 22, 2023

(30) Foreign Application Priority Data

Jul. 15, 2020  (CA) ................................ CA 3086864

(51) Int. Cl.
*F16L 1/11* (2006.01)
*G01V 3/00* (2006.01)

(52) U.S. Cl.
CPC ...................................... *F16L 1/11* (2013.01)

(58) Field of Classification Search
CPC .. F16L 1/11; G01V 15/00; G01V 3/08; G01V 3/165
See application file for complete search history.

(56) References Cited

U.S. PATENT DOCUMENTS

| 3,516,631 A | 6/1970 | Santucci |
| D271,940 S | 12/1983 | Muench |
| D272,042 S | 1/1984 | Muench |

(Continued)

FOREIGN PATENT DOCUMENTS

| EP | 1884702 A2 | 2/2008 |
| GB | 1556488 A | 11/1979 |
| WO | WO 2019056104 | * 3/2019 |

OTHER PUBLICATIONS

PCT Search Report and Written Opinion of PCT Application No. PCT/CA2021/050936, dated Sep. 21, 2021, 13 pages.

(Continued)

*Primary Examiner* — Sean D Andrish
(74) *Attorney, Agent, or Firm* — Maine Cernota & Curran

(57) ABSTRACT

A tracer wire holder for use in securing tracer wires along the top of a pipe before burial. The tracer wire holder is comprised of a first section and a second section connected by a flexible planar intermediate section. The first section has generally arcuate outer and inner walls. The second section has generally planar outer and inner walls and a plurality of rib members projecting from the inner wall. Locking means is provided to secure first section with second section in a closed locked position The first and second sections form a cavity for receiving and securing a tracer wire when the first section is secured with the second section.

12 Claims, 16 Drawing Sheets

(56) References Cited

U.S. PATENT DOCUMENTS

| | | | |
|---|---|---|---|
| D272,716 | S | 2/1984 | Muench |
| 4,623,102 | A | 11/1986 | Hough, Jr. |
| 4,650,925 | A | 3/1987 | Coldren |
| 4,923,153 | A | 5/1990 | Matsui et al. |
| D310,020 | S | 8/1990 | Fujioka |
| D329,373 | S | 9/1992 | Kaga |
| D329,374 | S | 9/1992 | Kaga |
| D353,990 | S | 1/1995 | Alfreds |
| D414,399 | S | 9/1999 | Nakamura |
| D455,337 | S | 4/2002 | Maruoka |
| D484,400 | S | 12/2003 | Blake |
| 6,732,983 | B1 | 5/2004 | Blake |
| D507,481 | S | 7/2005 | Blake |
| D521,856 | S | 5/2006 | Waaler |
| D569,718 | S | 5/2008 | Nakamura |
| D592,039 | S | 5/2009 | Okuda |
| 7,603,020 | B1 * | 10/2009 | Wakileh ............... G02B 6/4477 385/136 |
| D625,582 | S | 10/2010 | Cleghorn |
| D672,223 | S | 12/2012 | Thompson |
| 8,640,758 | B1 * | 2/2014 | Grosskruetz ............... F16L 1/11 156/577 |
| D709,354 | S | 7/2014 | Komeno |
| D741,701 | S | 10/2015 | McNeil |
| 9,638,354 | B1 | 5/2017 | Ogueli et al. |
| D798,139 | S | 9/2017 | Giannatti |
| D817,155 | S | 5/2018 | Li |
| D823,671 | S | 7/2018 | Rothbaum |
| D824,244 | S | 7/2018 | Rothbaum |
| D832,692 | S | 11/2018 | Wu |
| D833,264 | S | 11/2018 | Wu |
| D867,858 | S | 11/2019 | Ruddick |
| D907,993 | S | 1/2021 | MulHolland |
| D943,380 | S | 2/2022 | Hu |
| D953,582 | S | 5/2022 | Sudo |
| 2005/0116122 | A1 * | 6/2005 | Nakanishi ............... F16L 3/223 248/68.1 |
| 2008/0105563 | A1 | 5/2008 | Tiner et al. |
| 2014/0167763 | A1 | 6/2014 | Giraldi |
| 2017/0063064 | A1 | 3/2017 | Gintz |
| 2020/0032566 | A1 | 1/2020 | Fukumoto et al. |

OTHER PUBLICATIONS

Canadian Office Action for CA Application No. 3,164,960, dated Sep. 14, 2022, 3 pages.

* cited by examiner

TRACER WIRE HOLDER

RELATED APPLICATIONS

This application is a national phase application filed under 35 USC § 371 of PCT Application No. PCT/CA2021/050936 with an International filing date of Jul. 8, 2021. PCT Application No. PCT/CA2021/050936 claims priority from Canadian Patent Application Number 3086864 filed 15 Jul. 2020. Both of these applications are incorporated herein by reference in their entirety for all purposes.

FIELD OF THE INVENTION

The present invention relates to a tracer wire holder or fastener clip for use in securing tracer wires or cables along the top of a pipe before burial. A tracer wire is also called locating wire or locator wire and is used to assist in locating pipes and other lines after burial in the ground.

BACKGROUND OF THE INVENTION

Many types of buried pipes, including watermains, natural gas, propane, sewer, irrigation systems, and golf course sprinkler systems are often made of non-metallic materials. To assist in locating the path of a buried pipe, a metallic tracer wire is attached to the top of the pipe before burial. An above-ground wire tracer device is used to locate the tracer wire path. This allows for more accurate excavation of the pipes for maintenance, repairs or replacement. Site destruction is also greatly reduced.

Many government jurisdictions have established tracer wire standards and specifications. Such standards often require the use of a continuous tracer wire, such as copper tracer wire, laid flat on top of the centerline of the pipe and affixed at 3 meter [~10 feet] to 6 meter [~20 feet] intervals.

Traditional tracer wire installations involve wrapping the tracer wire around the pipe, like that of a Bowline knot. This method uses extra wire equivalent to the circumference of the pipe. For example, on a standard 323.85 mm (12") diameter watermain which is 6 metres (19.7 feet or 236 inches) in length, the circumference is roughly 1.016 meters (40 inches), namely 40/236=16.949% more tracer wire. The wrapping method is impractical since once the pipe is set on grade with a laser beam, and target, the pipe should not be moved. The wrapping of tracer wire on pipes also creates problems at the middle of a pipe section where, without any support, the tracer wire sags or droops down the side of the pipe when bedding is applied around it. This results in poor product delivery, and further unnecessary waste of tracer wire.

Wrapping tracer wire around a pipe to complete the knot is labour intensive potentially increases workplace injuries, including back strain and injuries to extremities because it requires the pipe-layer to lift the pipe with one hand while simultaneously trying to wrap the tracer wire around the pipe.

Another currently used approach to secure tracer wire to the top of pipes is to use tape, such as mastic tape. This method is time consuming and can be prone to failed fastening to the pipe, especially when installing pipe in unfavourable weather conditions. Most often during the pipe bedding process the tape will rip off the pipe and settle down to the side of the pipe. The work project is then delayed until the wire has been dug up and pulled back onto the top of the pipe and secured again with another application of tape.

U.S. Pat. No. 7,090,175 describes the use of multiple spaced apart devices that provide a 6 inch separation between the tracer wire and the pipe. The devices may be placed in the pipe trench beside the pipe. The device snaps on to a portion of a pipe of between ½" to 6" outside diameters.

The tracer wire holder of the present invention permits the secure and efficient laying of a continuous tracer wire onto the top of a pipe whilst reducing labour costs and potential workplace injuries.

SUMMARY OF THE INVENTION

The tracer wire holder of the present invention is comprised of a first section and a second section connected by a flexible planar intermediate section. The first section has generally arcuate outer and inner walls, a flexible snap clasp projecting from the first section inner wall and a flange member extending outwardly from the first section inner wall. The second section has generally planar outer and inner walls and a plurality of rib members projecting from the inner wall. The first and second sections form a cavity for receiving and securing a tracer wire when the first section is folded over onto the second section.

The tracer wire holder preferably uses a peel and stick process application for a quick and seamless application of the tracer wire holder to a pipe.

BRIEF DESCRIPTION OF THE DRAWINGS

The present invention may be further understood by reference to the description of the invention, taken in conjunction with the accompanying drawings, in which.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The exemplary embodiments of the disclosed subject matter will be best understood by reference to the drawings, wherein like parts may (but not in all cases) be designated by like numerals. It will be readily understood that the components of the disclosed subject matter, as generally described and illustrated in the figures herein, could be arranged and designed in a wide variety of different configurations. Thus, the following more detailed description of the embodiments of the apparatus, system, and method of the disclosed subject matter, as represented in the accompanying figures, is not intended to limit the scope of the disclosed subject matter, as claimed, but is merely representative of exemplary embodiments of the disclosed subject matter.

Figure 1:
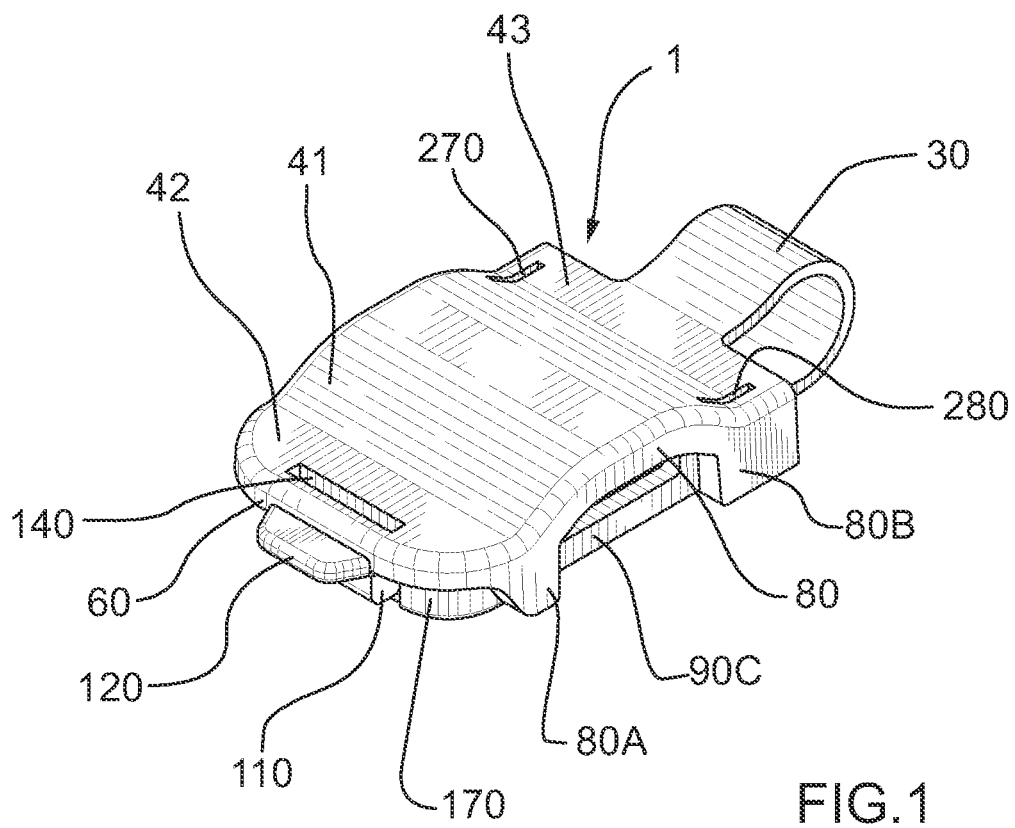
FIG. 1 is a perspective top view of an embodiment of a Tracer Wire Holder of the present invention in a closed position.
Figure 2:
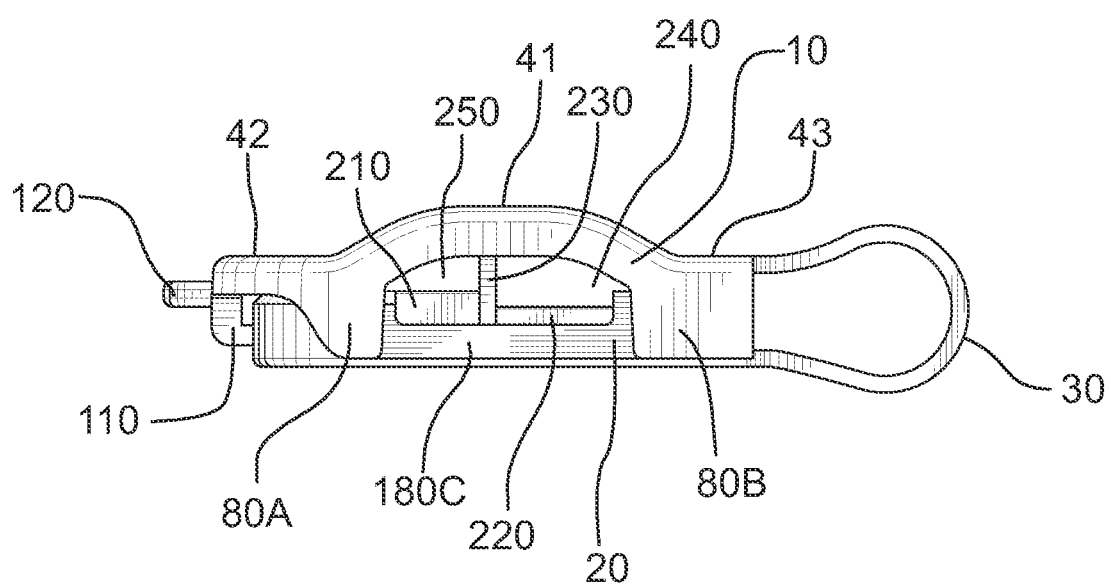
FIG. 2 is a side view of the Tracer Wire Holder of FIG. 1.
Figure 3:
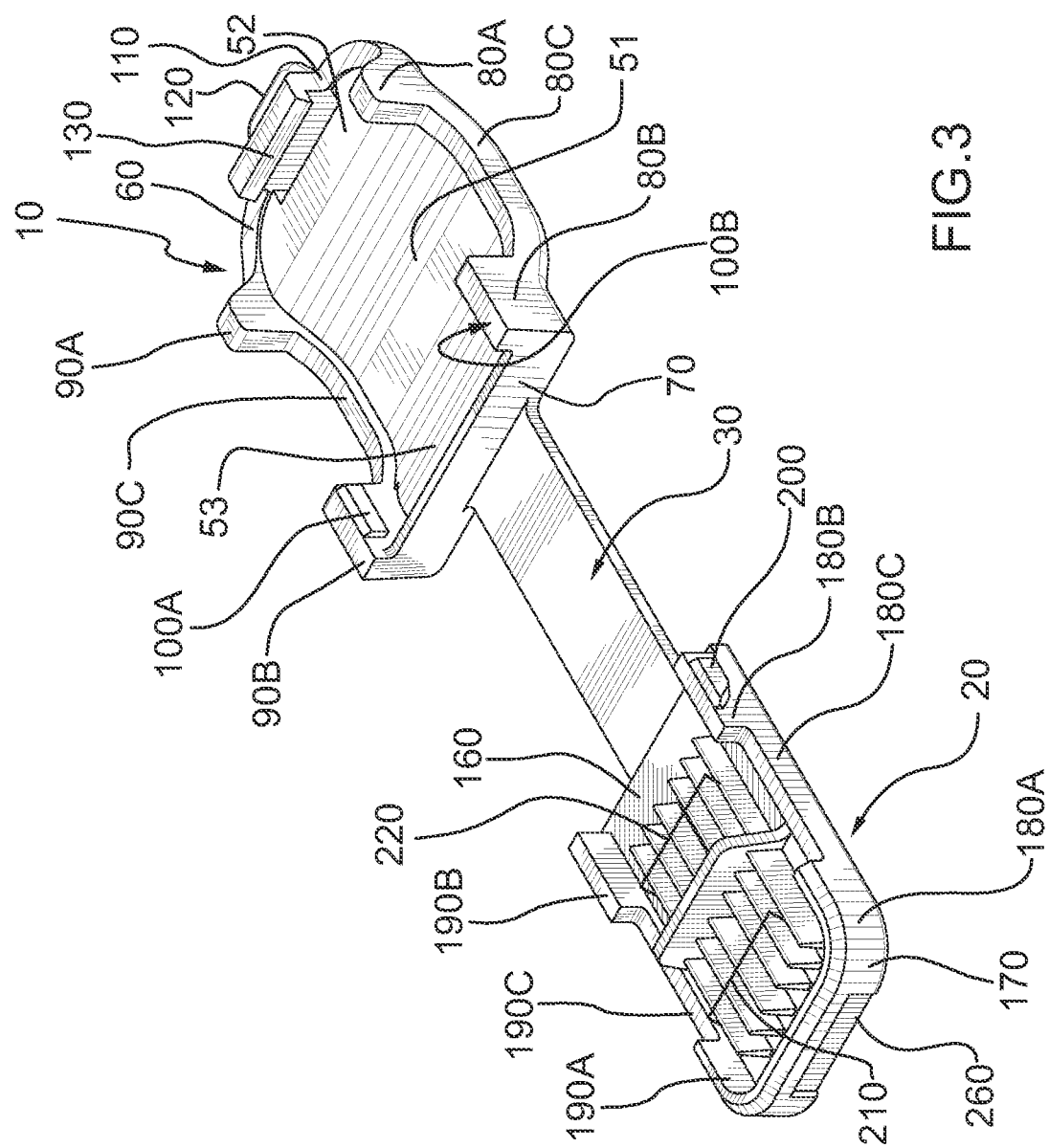
FIG. 3 is a perspective top view of a Tracer Wire Holder of FIG. 1 in an open position.
Figure 4:
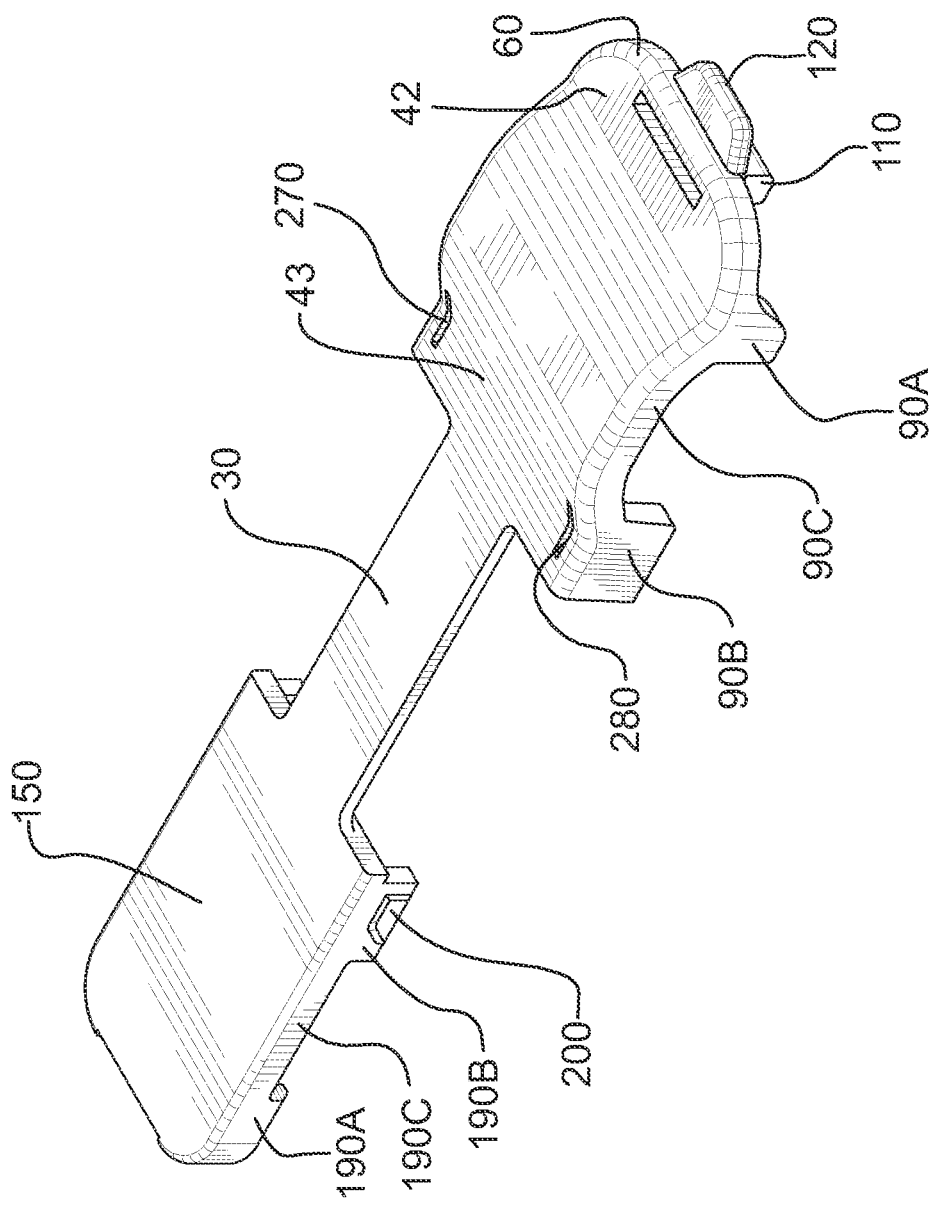
FIG. 4 is a perspective bottom view of the Tracer Wire Holder of FIG. 3.

Referring to FIGS. 1 to 4, a tracer wire holder 1 is comprised of a first section 10 and a second section 20 connected by a pliable intermediate section 30. With reference to FIG. 3, first section 10 comprises a base having an outer wall surface with a generally arcuate middle portion 41, a first planar end portion 42, and a second first planar end portion 43. The first section has a corresponding inner wall surface 50 with an arcuate middle portion 51, a first planar end portion 52, and a second first planar end portion 53. The inner wall surface 50 has a first end wall 60 and a second end wall 70. Inner wall surface 50 has opposing side walls 80 and 90 along the side perimeters. Side wall 80 consists of side wall portions 80A and 80B and intermediate side wall portion 80C. The heights of side wall portions 80A and 80B are greater than intermediate side wall portion 80C thereby creating a middle-notched of side wall 80. Side wall portions 80A and 80B adjoin end walls 60 and 70 respectively. Opposing side wall 90 consists of side wall portions 90A and 90B and intermediate side wall portion 90C. The heights of side wall portions 90A and 90B are greater than intermediate side wall portion 90C thereby creating a middle-notched section of side wall 90. Side wall portions 90A and 90B adjoin end walls 60 and 70 respectively. The inner surface of side wall portion 90B has a flange 100A. A like flange projects from the inner surface of side wall portion 80B at the location identified as 100B.

A locking bracket 110 projects upwards from the centre portion of end wall 60. The locking bracket 110 has an outwardly extended tab 120 at a first end of the bracket and an inwardly extended flange hook 130 at a second end of the bracket. The locking bracket 110 is disposed adjacent a slotted aperture 140 in first section 10. The slotted aperture is the width of locking bracket 110.

The second section 20 has a base having generally planar outer wall surface 150 and an inner wall surface 160 with an end wall 170. Inner wall surface 160 has opposing side walls 180 and 190 along the side perimeters. Side wall 180 consists of side wall portions 180A and 180B and intermediate side wall portion 180C. The heights of side wall portions 180A and 180B are greater than intermediate side wall portion 180C thereby creating a middle-notched section of side wall 180. Side wall 190 consists of side wall portions 190A and 190B and intermediate side wall portion 190C. The heights of side wall portions 190A and 190B are greater than intermediate side wall portion 190C thereby creating a middle-notched section of side wall 190. Side wall portions 180A and 190A adjoin end wall 170. The width of second section 20 between the outer surfaces of the side walls is dimensionally less than the width of first section 10 between the inner surfaces of the side wall. The outer surface of side wall portion 180B has a flange member 200. A like flange member, not shown, projects from the outer surface of side wall portion 190B.

A first set of rib flanges 210 are disposed on inner wall surface 160 parallel to side walls 180 and 190. Optionally, as shown in FIGS. 2 and 3, a second set of rib flanges 220 may be disposed on inner wall surface 160 parallel to side walls 180 and 190. Rib flanges 210 and 200 are separated by a spacer member 230 disposed perpendicular to and between the two sets of rib flanges. Rib flanges 210 and 220 may be the same height or different heights. Different heights as shown in FIGS. 2 and 3 permit the tracer wire holder 1 to be used universally in the sewer and water industry because many municipalities have different wire diameters and specifications for different applications. By way of example, the side view in FIG. 2, shows different sized cavity openings 240 and 250.

When the tracer wire holder 1 is locked in a closed position as shown in FIG. 2 the spacer member 230 and the rib flanges 210 and 220 position and retain tracer wires [not shown] in place in either or both cavity openings 240 and 250 created by middle notched sections of first section 10, middle notched sections of second section 20, spacer member 230, end wall 170 of second section 20 and end wall 70 of first section 10.

After several tracer wire holders are fastened onto a pipe, a tracer wire is placed on ribs 210 or 220 before the holder is closed into a locked position. A tracer wire holder 1 of FIG. 3 is put into a locked closed position shown in FIGS. 1 and 2 by rotationally moving first section 10 over second section 20 and pressing first section 10 onto second section 20. The pressing force causes flange 100A and the like opposing flange at 100B to slide over and interlock with flange member 200 and the like opposing flange member. A longitudinal recessed portion 260 is disposed on the outside edge of end wall 170 at the adjoining edge of outside wall surface 150. Recessed portion 260 is dimensioned to receive and retain flange hook 120 of locking bracket 110 after first section 10 is rotated over intermediate section 30 onto second section 20 thereby securing first section 10 with second section 20 in a closed position. The securing of first and second sections holds a tracer wire in place when affixing the tracer wire holder to a pipe.

The closed tracer wire holder 1 can be re-opened in case of an error during the installation. For example, a tracer wire sometimes cannot be pulled tight enough, leaving slack in the wire, which increases the likelihood of installation error. The locking bracket 110 juxtaposition with slotted aperture 140 permits a slight rotational movement of the bracket 110 towards the aperture thereby permitting re-opening of the tracer wire holder and decreasing the potential of wasted tracer wire. The locking flange hook 120 of locking bracket 110 is disengaged from recessed portion 260 by pulling tab 120 upwards. This described unlocking of first section 10 from second section 20 creates enough space in cavity openings 240 and 250 to allow repositioning of the tracer wire. To fully release the first section 10 from the second section 20, a standard flat-head screwdriver or like device may be inserted into slots 270 and 280 to disengage projecting flanges 100 from flange members 200A.

Another exemplary embodiment as shown in FIGS. 5A to 5E is generally similarly configured as the exemplary embodiment shown in FIGS. 1 to 4 but with different locking mechanisms to secure first section 10 with second section 20. First section 10 has a base having an outer wall surface having a generally arcuate middle portion 41, a first planar end portion 42, and a second first planar end portion 43. The first section has a corresponding inner wall surface 50 with an arcuate middle portion 51, a first planar end portion 52, and a second first planar end portion 53. Planar end portions 42 and 52 have a first slotted aperture 300 therethrough and planar end portions 43 and 53 have a second slotted aperture 315 therethrough. The inner wall surface 50 has first end wall 60 and a second end wall 70. Inner wall surface 50 has opposing side walls 80 and 90 along the side perimeters. Side wall 80 consists of side wall portions 80A and 80B and intermediate side wall portion 80C. The heights of side wall portions 80A and 80B are greater than intermediate side wall portion 80C thereby creating a middle-notched section of side wall 80. Side wall portions 80A and 80B adjoin end walls 60 and 70 respectively. Opposing side wall 90 consists of side wall portions 90A and 90B and intermediate side wall portion 90C. The heights of side wall portions 90A and 90B are greater than intermediate side wall portion 90C thereby creating a middle-notched section of side wall 90. Side wall portions 90A and 90B adjoin end walls 60 and 70 respectively.

The second section 20 has a base having a generally planar outer wall surface 150 and an inner wall surface 160 with an end wall 170. Inner wall surface 160 has opposing side walls 180 and 190 along the side perimeters. Side wall 180 consists of side wall portions 180A and 180B and intermediate side wall portion 180C. The heights of side wall portions 180A and 180B are greater than intermediate side wall portion 180C thereby creating a middle-notched section of side wall 180. Side wall 190 consists of side wall portions 190A and 190B and intermediate side wall portion 190C. The heights of side wall portions 190A and 190B are greater than intermediate side wall portion 190C thereby creating a middle-notched section of side wall 190. Side wall portions 180A and 190A adjoin end wall 170. The width of second section 20 between the outer surfaces of the side walls is dimensionally less than the width of first section 10 between the inner surfaces of the side wall.

A first locking bracket 310 projects upwards from the centre portion of end wall 170. The locking bracket 310 has an outwardly extended flange hook 340 at the upper end of the bracket.

A second locking bracket 350 projects from inner surface 160 forming a partial end wall across from end wall 170.

A first set of multiple rib flanges 210 are disposed on inner wall surface 160 parallel to side walls 180 and 190. Optionally, a second set of multiple rib flanges 220 may be disposed on inner wall surface 160 parallel to side walls 180 and 190. Rib flanges 210 and 220 are separated by a spacer member 230 disposed perpendicular to and between the two sets of rib flanges. Rib flanges 210 and 220 may be the same height or different heights. By way of example, the side view in FIG. 5D, shows different sized cavity openings 240 and 250.

Figure 5A:
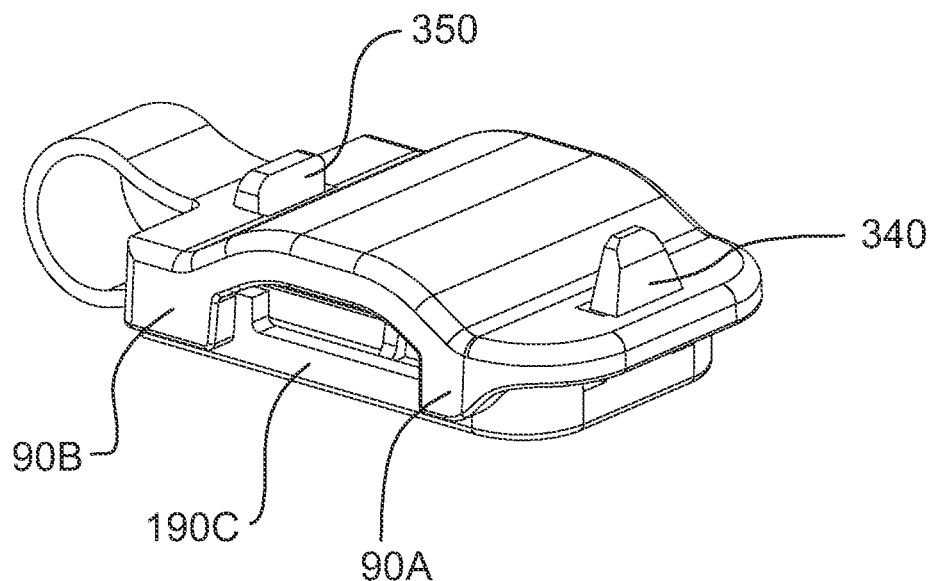
FIGS. 5A and 5E are perspective views of another embodiment of a Tracer Wire Holder of the present invention in a closed position.
Figure 5B:
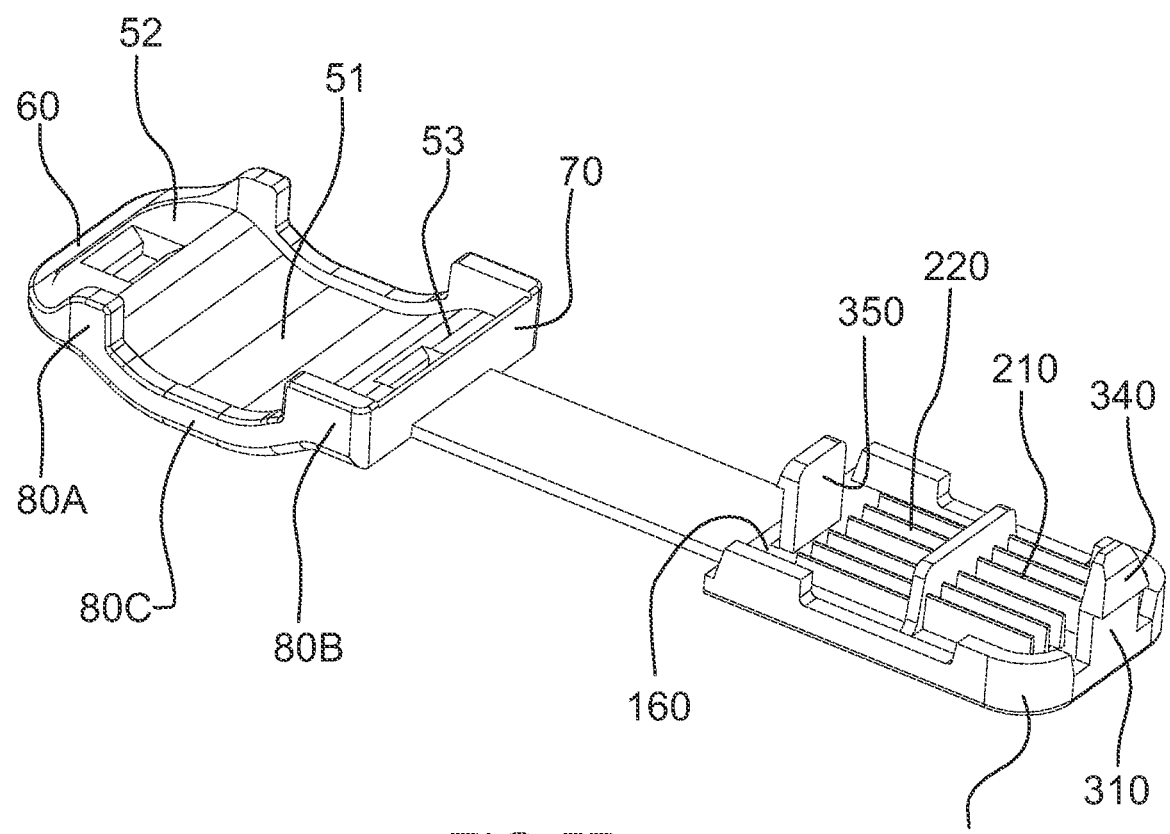
FIGS. 5B and 5C are top and bottom perspective views of the Tracer Wire Holder of FIG. 5A in an open position.
Figure 5C:
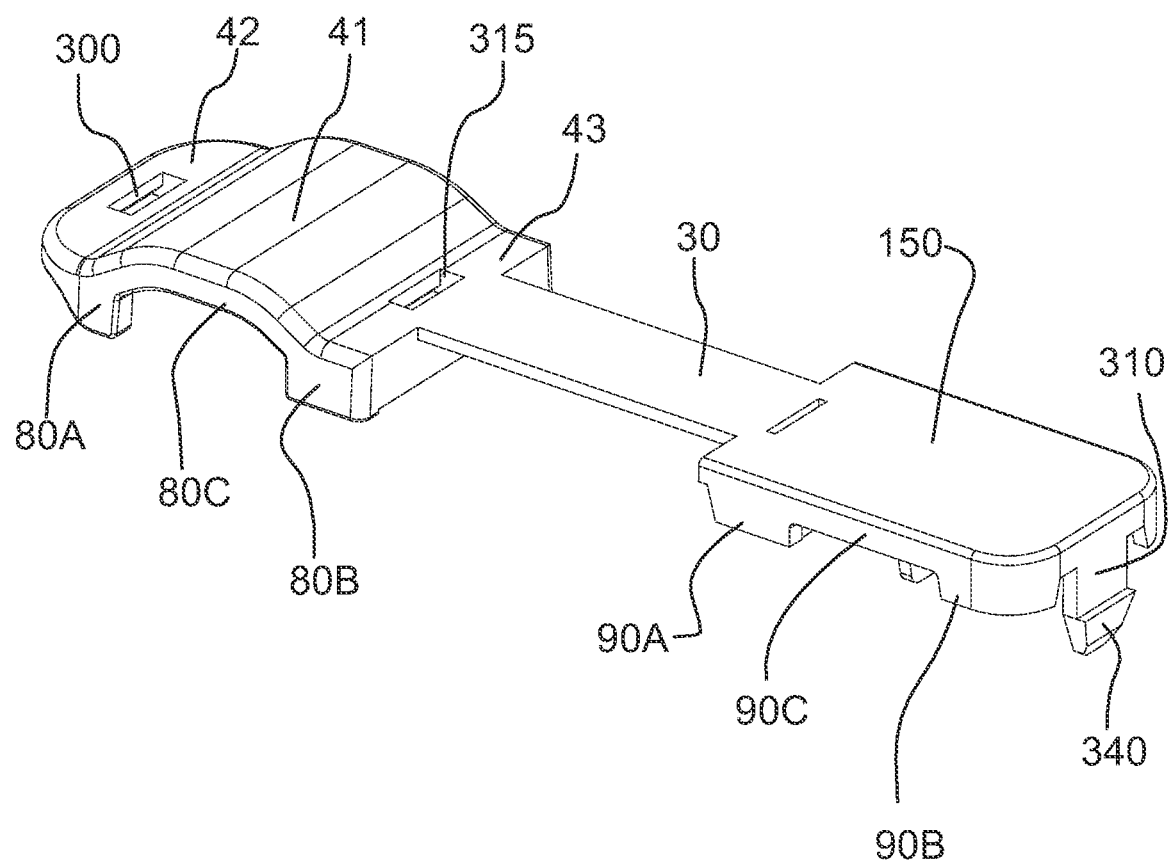
Figure 5D:
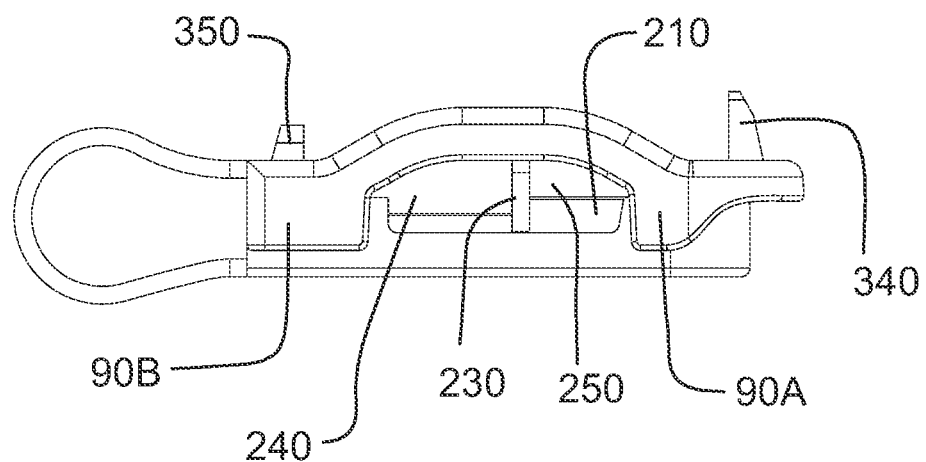
FIG. 5D is a side view of the Tracer Wire Holder of FIG. 5A.

When the tracer wire holder 1 is in a closed locked position as shown in FIGS. 5A and 5D the spacer member 230 and the rib flanges 210 and 220 position and retain tracer wires in place [not shown] in either or both cavity openings 240 and 250 created by middle notched sections of first section 10, middle notched sections of second section 20, spacer member 230, end wall 170 of second section 20 and second locking bracket 350 of first section 10.

Figure 5E:
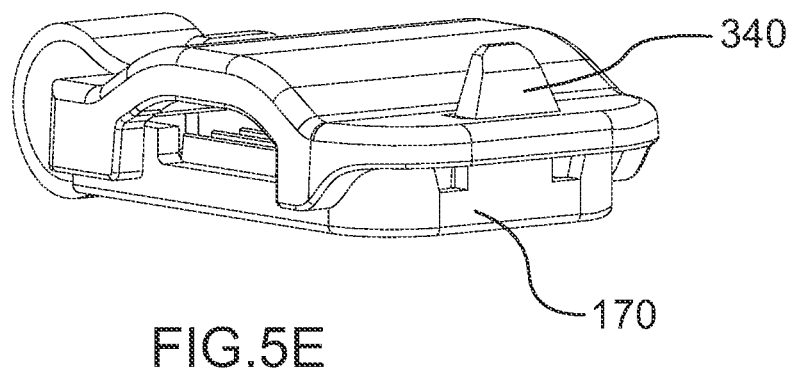

A tracer wire holder 1 of FIG. 5B is put into a closed locked position shown in FIGS. 5A, 5D and 5E by rotationally moving first section 10 over intermediate section 30 and pressing first section 10 onto second section 20. First slotted aperture 300 receives first locking bracket 320. Flange hook 340 of locking bracket 310 engages and clasps onto planar surface 42. Second slotted aperture 315 receives and engages second locking bracket 350, thereby securing first section 10 with second section 20 in a closed locked position. The locking of the first and second sections secures the tracer wire in place when affixing the tracer wire holder to a pipe.

The closed tracer wire holder 1 with the configurations shown in FIGS. 5A to 5E can be re-opened. Locking brackets 310 and 350 may be released from engagement and their slotted apertures by pinching the brackets towards the center of the holder as shown by the arrows in FIG. 5A to release the first section 10 from locking engagement with second section 20 thereby allowing the holder to be opened.

Figure 6A:
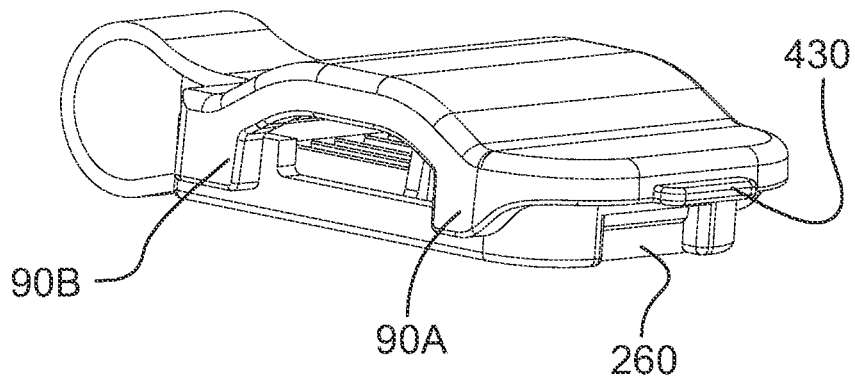
FIGS. 6A and 6E are perspective views of a further embodiment of a Tracer Wire Holder of the present invention in a closed position.
Figure 6B:
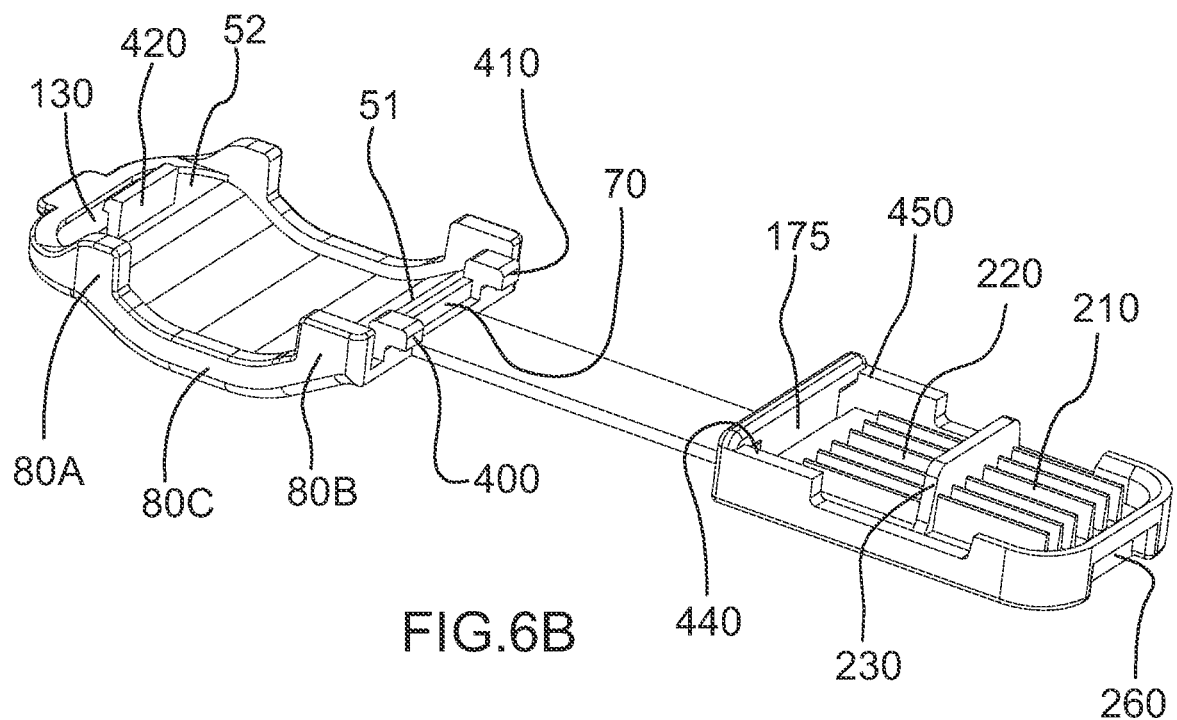
FIGS. 6B and 6C are top and bottom perspective views of the Tracer Wire Holder of FIG. 6A in an open position.
Figure 6C:
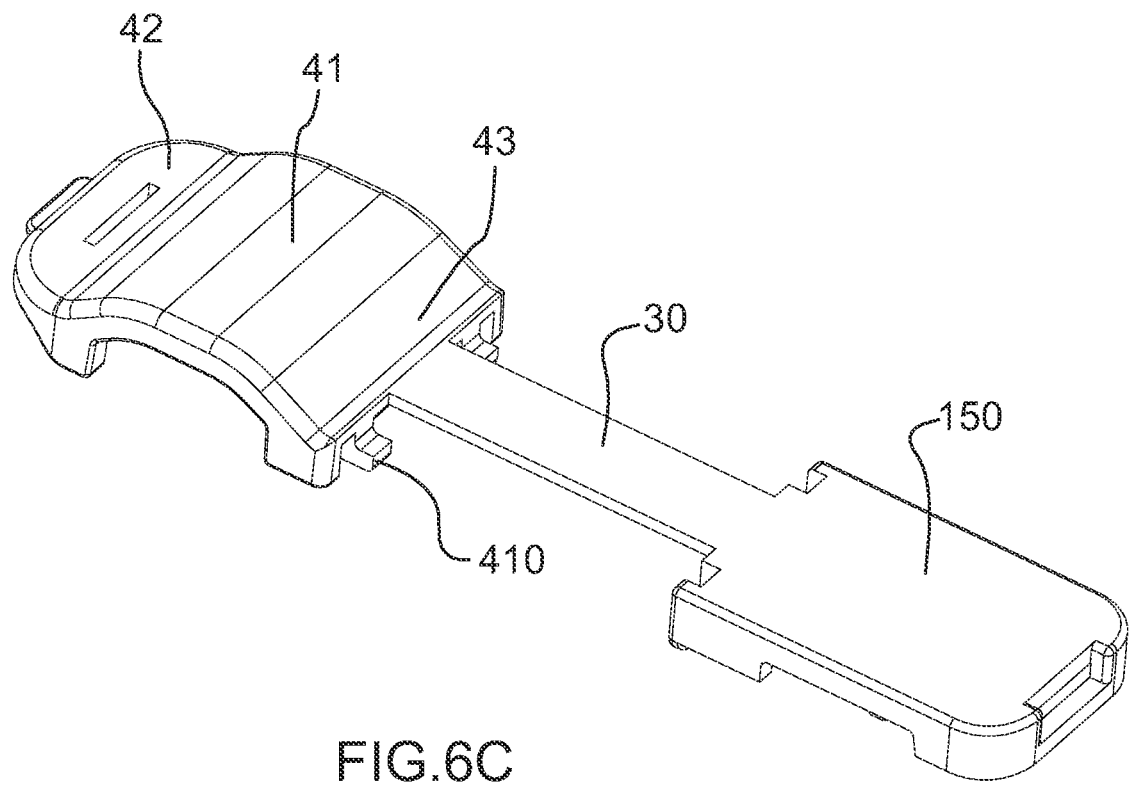
Figure 6D:
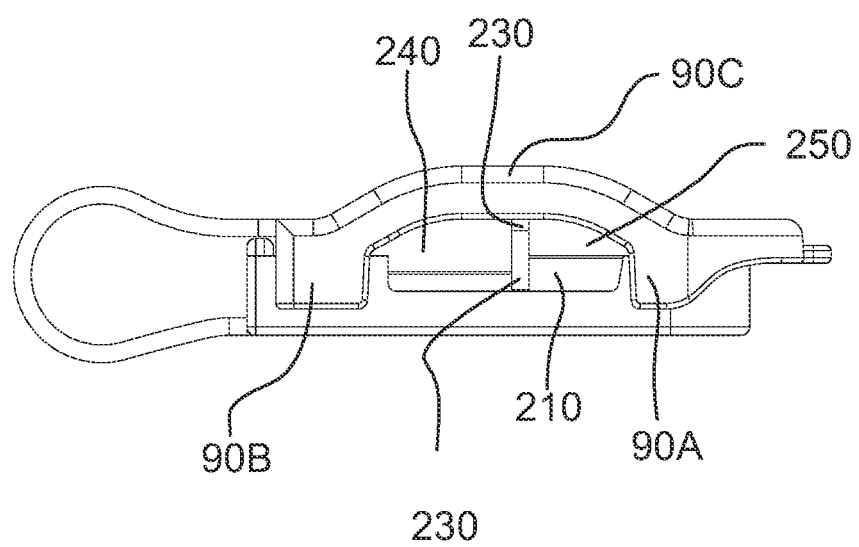
FIG. 6D is a side view of the Tracer Wire Holder of FIG. 6A.
Figure 6E:
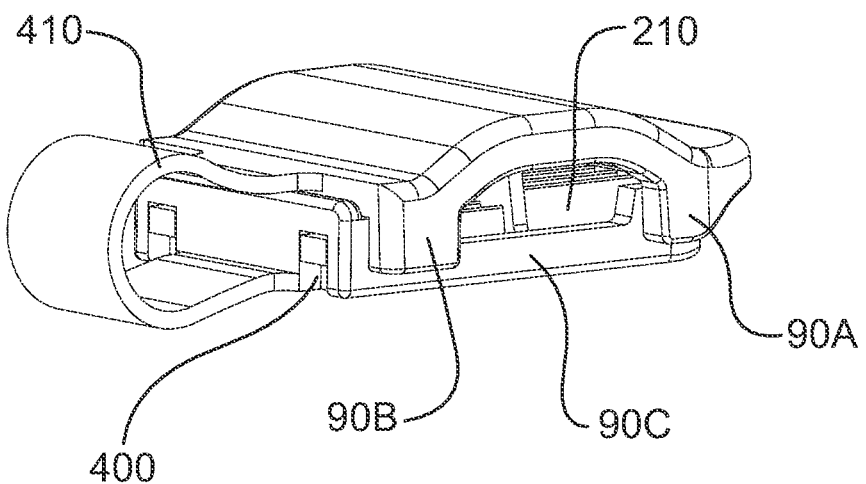
Figure 6F:
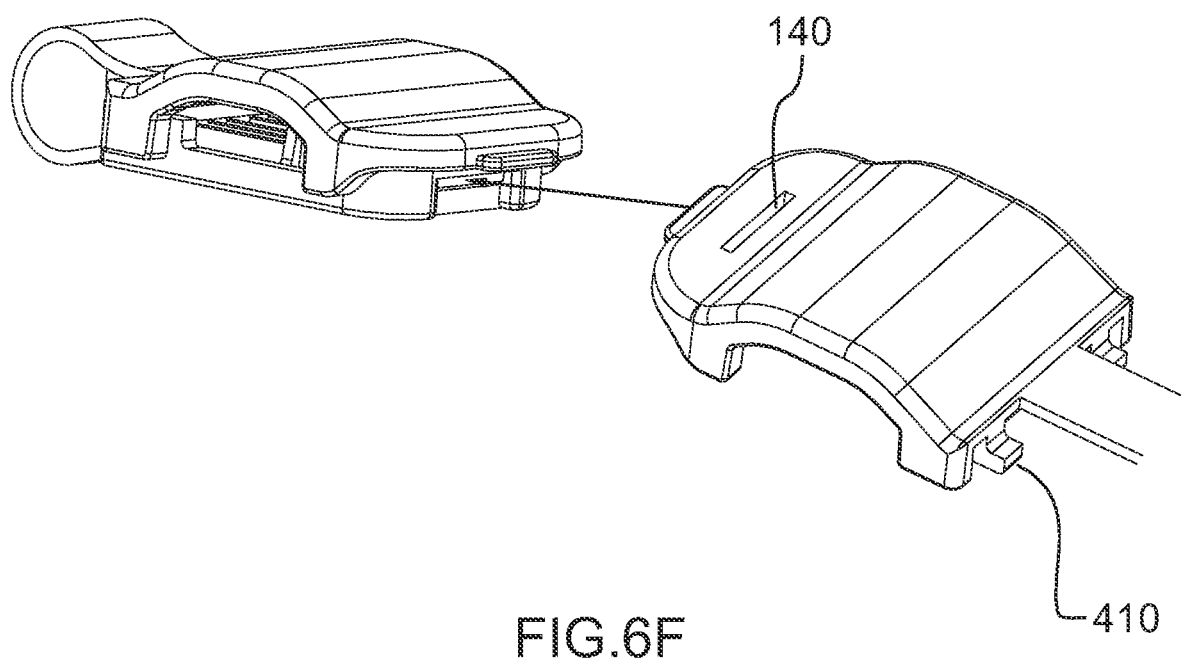
FIG. 6F illustrates the use of a projection on the upper end of a Tracer Wire Holder of can be positioned to depress the snap of another Tracer Wire Holder such as FIG. 6A.

A further exemplary embodiment of a tracer wire holder 1 shown in FIGS. 6A to 6F is generally similarly configured as the exemplary embodiment shown in FIGS. 1 to 4 but with a different locking mechanism to secure first section 10 with second section 20. The tracer wire holder 1 is comprised of a first section 10 and a second section 20 connected by a pliable intermediate section 30. With reference to FIGS. 6C and 6F, first section 10 has a base having an outer wall surface having a generally arcuate middle portion 41 and a first planar end portion 42, and a second first planar end portion 43. The first section has a corresponding inner wall surface 50 with an arcuate middle portion 51, a first planar end portion 52, and a second first planar end portion 53. The inner wall surface 50 has first end wall 60 and a second end wall 70. First end wall 60 optionally has an outwardly extending tab 65. Inner wall surface 50 has opposing side walls 80 and 90 along the side perimeters. Side wall 80 consists of side wall portions 80A and 80B and intermediate side wall portion 80C. The heights of side wall portions 80A and 80B are greater than intermediate side wall portion 80C thereby creating a middle-notched section of side wall 80. Side wall portions 80A and 80B adjoin end walls 60 and 70 respectively. Opposing side wall 90 consists of side wall portions 90A and 90B and intermediate side wall portion 90C. The heights of side wall portions 90A and 90B are greater than intermediate side wall portion 90C thereby creating a middle-notched section of side wall 90. Side wall portions 90A and 90B adjoin end walls 60 and 70 respectively. Lugs 400 and 410 are disposed proximate each edge of end wall 70 and project towards intermediate section 30.

A locking bracket 420 projects upwards from the centre portion of end portion 52. The locking bracket 420 has an outwardly extended tab 430 at a first end of the bracket and an inwardly extended flange hook 130 at a second end of the bracket. The locking bracket 420 is disposed adjacent a slotted aperture 140 in first section 10. The slotted aperture is the width of locking bracket 420.

The second section 20 has a base having a generally planar outer wall surface 150 and an inner wall surface 160 with first end wall 170 and second end wall 175. Inner wall surface 160 has opposing side walls 180 and 190 along the side perimeters. Side wall 180 consists of side wall portions 180A and 180B and intermediate side wall portion 180C. The heights of side wall portions 180A and 180B are greater than intermediate side wall portion 180C thereby creating a middle-notched section of side wall 180. Side wall 190 consists of side wall portions 190A and 190B and intermediate side wall portion 190C. The heights of side wall portions 190A and 190B are greater than intermediate side wall portion 190C thereby creating a middle-notched section of side wall 190. Side wall portions 180A and 190A adjoin end wall 170 and side wall portions 180B and 190B adjoin end wall 175. The width of second section 20 between the outer surfaces of the side walls is dimensionally less than the width of first section 10 between the inner surfaces of the side wall. The outer surface of end wall 175 has apertures 440 and 450 for receiving lugs 400 and 410.

A first set of multiple rib flanges 210 are disposed on inner wall surface 160 parallel to side walls 180 and 190. Optionally, a second set of multiple rib flanges 220 may be disposed on inner wall surface 160 parallel to side walls 180 and 190. Rib flanges 210 and 200 are separated by a spacer member 230 disposed perpendicular between the two sets of rib flanges. Rib flanges 210 and 220 may be the same height or different heights. The side view in FIG. 6D shows different sized cavity openings 240 and 250.

When the tracer wire holder 1 is in a closed locked position as shown in FIGS. 6A and 6D the spacer member 230 and the rib flanges 210 and 220 position and retain tracer wires [not shown] in place in either or both cavity openings 240 and 250 created by middle notched sections of first section 10, middle notched sections of second section 20, spacer member 230, and end walls 170 and 175. A longitudinal recessed portion 260 is disposed on the outside edge of end wall 170 at the adjoining edge of outside wall surface 150. Recessed portion 260 is configured to receive and engage tab 430 of locking bracket 420.

After tracer wire is placed into position on a pipe, open tracer wire holder 1 of FIG. 6B is put into a closed locked position by rotationally moving first section 10 over intermediate section 30 and pressing first section 10 towards second section 20. As first section 10 is rotated toward second section 20 lugs 400 and 410 move through apertures 430 and 440 and tab 430 of locking bracket 420 snaps into locking engagement with recessed portion 260, thereby securing first section 10 with second section 20 in a closed locked position.

As shown in FIGS. 6A and 6F, tab 430 may be released from a locked position by pushing against locking bracket 410 near the lower end of end wall 160 of first section 10. The pushing force disengages looking tab 430 from recessed portion 260. A tab 65 of another wire holder 1 holder may be used to push against locking bracket. This avoids an installer needing a screwdriver head or other object to release the locking bracket.

Another exemplary embodiment of a tracer wire holder 1 shown in FIGS. 7A to 7D is generally similarly configured as the exemplary embodiment shown in FIGS. 1 to 4 but with a different locking mechanism to secure first section 10 with second section 20.

Referring to FIGS. 7A to 7D, a tracer wire holder 1 is comprised of a first section 10 and a second section 20 connected by a pliable intermediate section 30. First section 10 has a base having an outer wall surface having a generally arcuate middle portion 41, a first planar end portion 42, and a second first planar end portion 43. The first section has a corresponding inner wall surface 50 with an arcuate middle portion 51, a first planar end portion 52, and a second first planar end portion 53. The inner wall surface 50 has first end wall 60 and a second end wall 70. Inner wall surface 50 has opposing side walls 80 and 90 along the side perimeters. Side wall 80 consists of side wall portions 80A and 80B and intermediate side wall portion 80C. The heights of side wall portions 80A and 80B are greater than intermediate side wall portion 80C thereby creating a middle-notched section of side wall 80. Side wall portions 80A and 80B adjoin end walls 60 and 70 respectively. Opposing side wall 90 consists of side wall portions 90A and 90B and intermediate side wall portion 90C. The heights of side wall portions 90A and 90B are greater than intermediate side wall portion 90C thereby creating a middle-notched section of side wall 90. Side wall portions 90A and 90B adjoin end walls 60 and 70 respectively. The inner surface of side wall portion 90B has a projecting flange 100A. A like flange projects from the inner surface of side wall portion 80B at the location identified as 100B.

A locking bracket 500 projects upwards from the centre portion of end wall 60. The locking bracket 500 is "T-shaped" with a first tab 510 and a second tab 520 projecting from the end of the bracket. The locking bracket 500 is disposed adjacent a slotted aperture 140 in first section 10. The slotted aperture is the width of locking bracket 500.

The second section 20 has a base having a generally planar outer wall surface 150 and an inner wall surface 160 with one end wall 170. Inner wall surface 160 has opposing side walls 180 and 190 along the side perimeters. Side wall 180 consists of side wall portions 180A and 180B and intermediate side wall portion 180C. The heights of side wall portions 180A and 180B are greater than intermediate side wall portion 180C thereby creating a middle-notched section of side wall 180. Side wall 190 consists of side wall portions 190A and 190B and intermediate side wall portion 190C. The heights of side wall portions 190A and 190B are greater than intermediate side wall portion 190C thereby creating a middle-notched section of side wall 190. Side wall portions 180A and 190A adjoin end wall 170. The width of second section 20 between the outer surfaces of the side walls is dimensionally less than the width of first section 10 between the inner surfaces of the side wall]. The outer surface of side wall portion 180B has a flange member 200. A like flange, not shown, projects from the outer surface of side wall portion 190B.

A first set of multiple rib flanges 210 are disposed on inner wall surface 160 parallel to side walls 180 and 190. Optionally, a second set of multiple rib flanges 220 may be disposed on inner wall surface 160 parallel to side walls 180 and 190. Rib flanges 210 and 200 are separated by a spacer member 230 disposed perpendicular between the two sets of rib flanges. Rib flanges 210 and 220 may be the same height or different heights. By way of example, the side view in FIG. 7D shows different sized cavity openings 240 and 250.

Figure 7A:
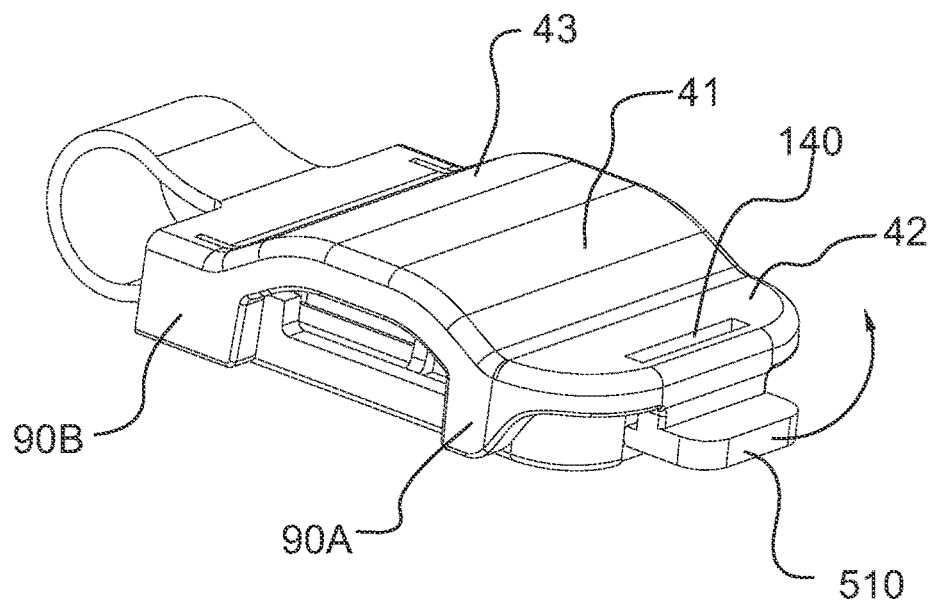
FIG. 7A is a perspective view of further embodiment of a Tracer Wire Holder of the present invention in a closed position.
Figure 7B:
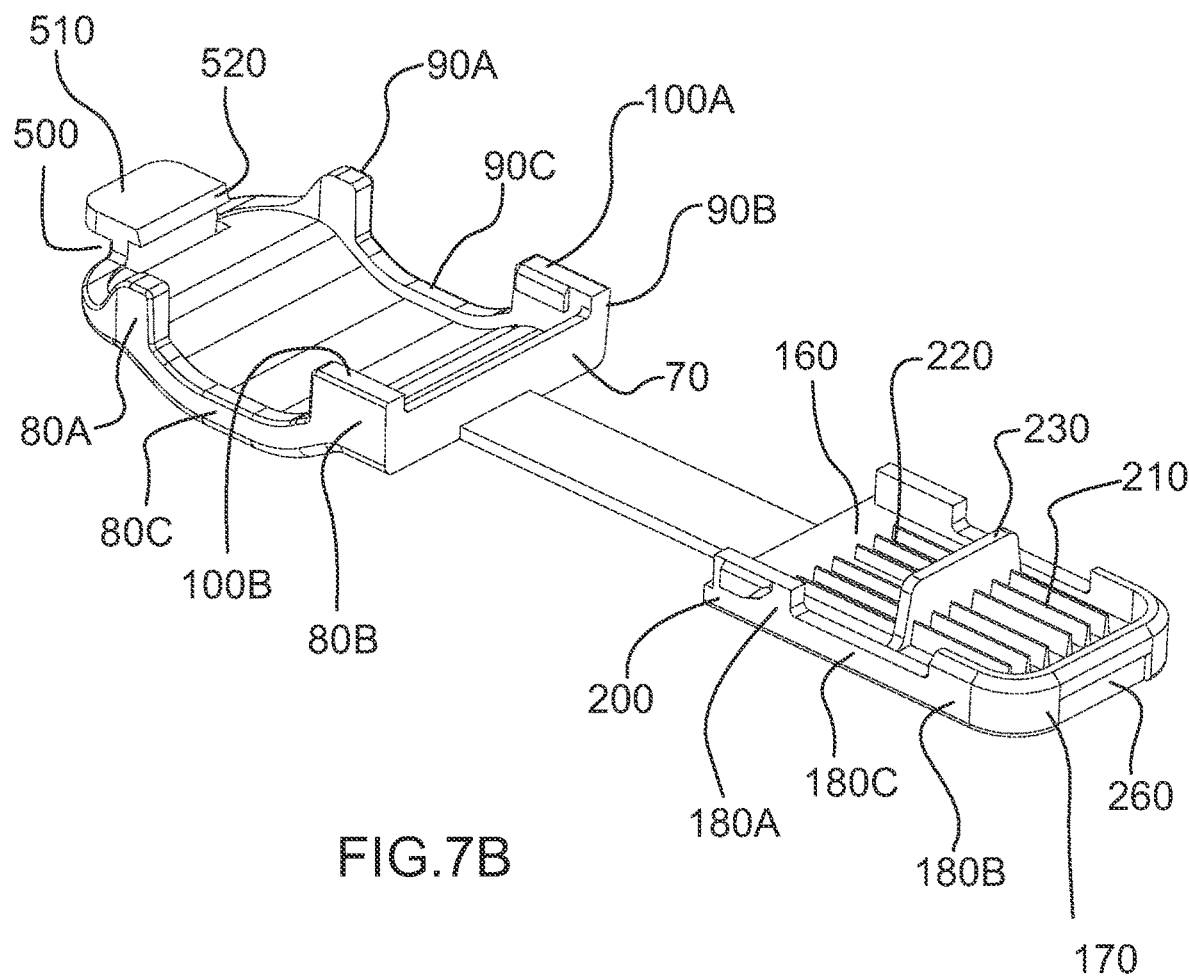
FIGS. 7B and 7C are top and bottom perspective views of the Tracer Wire Holder of FIG. 7A in an open position.
Figure 7C:
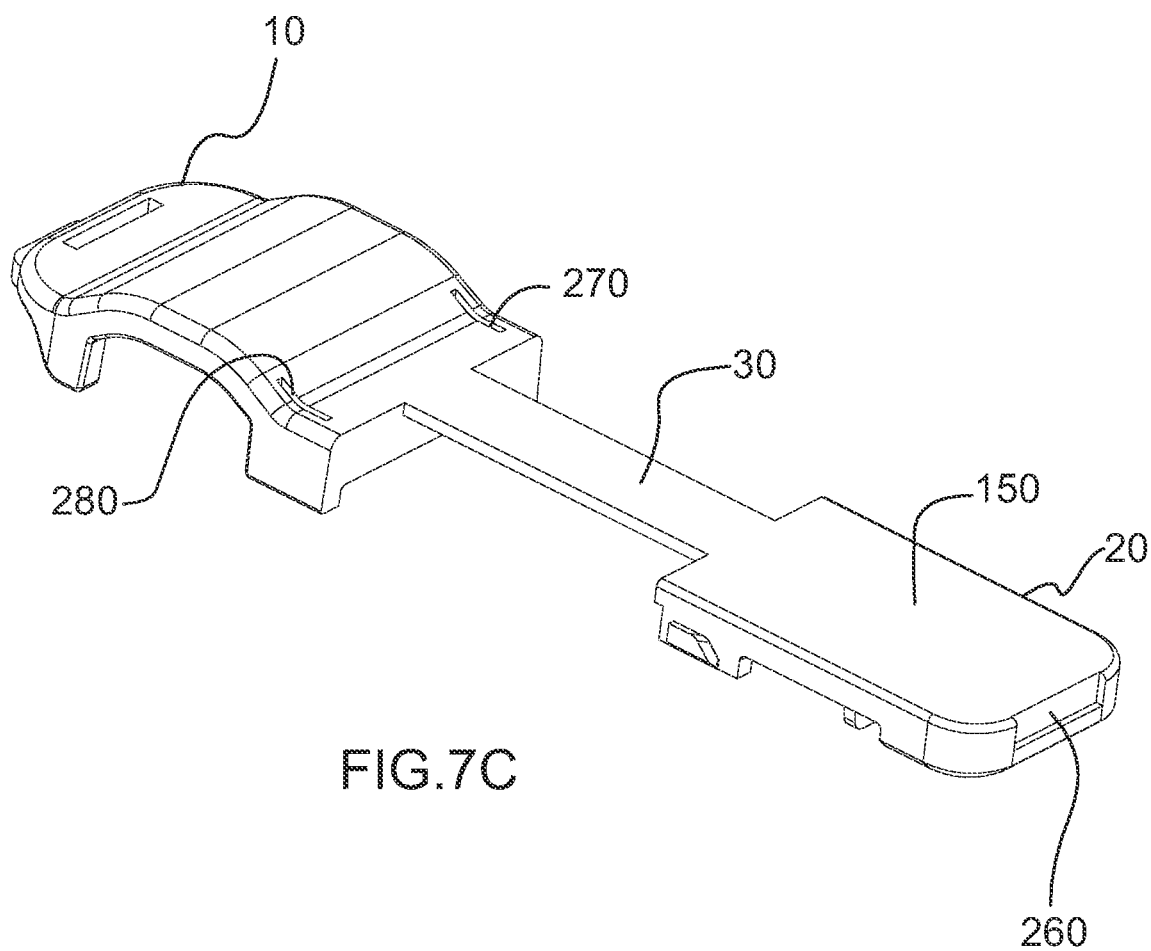
Figure 7D:
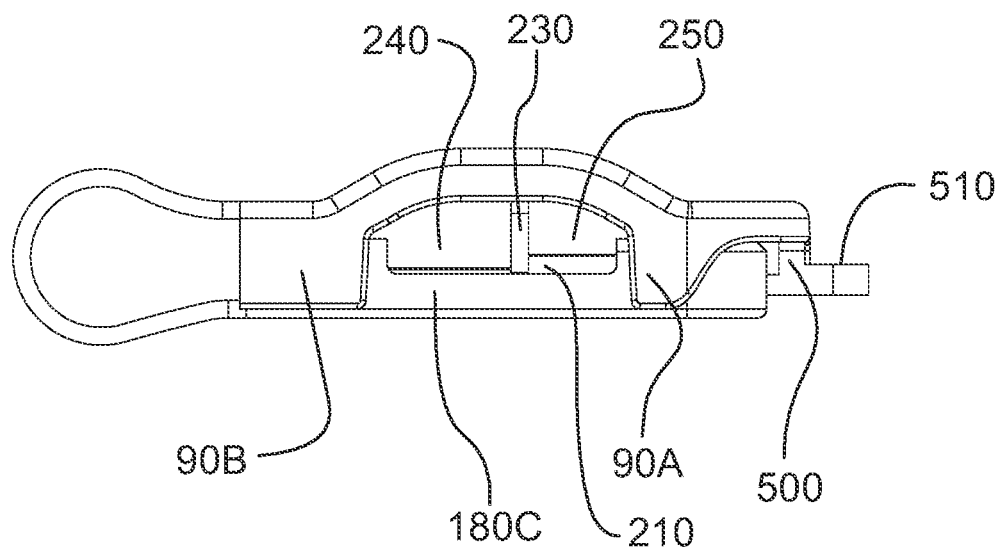
FIG. 7D is a side view of the Tracer Wire Holder of FIG. 7A.

When the tracer wire holder 1 is in a closed locked position as shown in FIG. 7D the spacer member 230 and the rib flanges 210 and 220 position and retain tracer wires [not shown] in place in either or both cavity openings 240 and 250 created by middle notched sections of first section 10, middle notched sections of second section 20, spacer member 230, end wall 170 of second section 20 and end wall 70 of first section 10.

A tracer wire holder 1 of FIG. 7B is put into a locked closed position shown in FIGS. 7A and 7D by rotationally moving first section 10 over intermediate section 30 onto second section 20 and pressing first section 10 onto second section 2. The pressing force causes projecting flange 100A and the like opposing flange at 100B to slide over and interlock with flange member 200 and the like opposing flange member. A longitudinal recessed portion 260 is disposed on the outside edge of end wall 170 at the adjoining edge of outside wall surface 150. Recessed portion 260 is dimensioned to receive and engage tab 510 of locking bracket 500 after first section 10 is rotated over intermediate section 30 onto second section 20 thereby securing first section 10 with second section 20 in a closed locked position. The securing of the first and second section holds a tracer wire in place when affixing the tracer wire holder to a pipe.

The locking bracket 500 juxtaposition with slotted aperture 140 permits a slight rotational movement of the bracket 500 towards the aperture thereby permitting re-opening of the tracer wire holder and decreasing the potential of wasted tracer wire. Pulling up on tab 520 as depicted by the arrow in FIG. 7A, disengages tab 510 from recessed portion 260. If necessary. a standard flat-head screwdriver or like device may be inserted into slots 270 and 280 to disengage projecting flanges 100 from flange members 200.

Another exemplary embodiment of a tracer wire holder 1 shown in FIGS. 8A to 8D is generally similarly configured as the exemplary embodiment shown in FIGS. 1 to 4 but with a different locking mechanism to secure first section 10 with second section 20. First section 10 has a base having an outer wall surface 40 having a generally arcuate middle portion 41, a first planar end portion 42, and a second first planar end portion 43. The first section has a corresponding inner wall surface 50 with an arcuate middle portion 51, a first planar end portion 52, and a second first planar end portion 53. Middle portion 51 has a slotted aperture 600 therethrough. The inner wall surface 50 has first end wall 60 and a second end wall 70. Inner wall surface 50 has opposing side walls 80 and 90 along the side perimeters. Side wall 80 consists of side wall portions 80A and 80B and intermediate side wall portion 80C. The heights of side wall portions 80A and 80B are greater than intermediate side wall portion 80C thereby creating a middle-notched section of side wall 80. Side wall portions 80A and 80B adjoin end walls 60 and 70 respectively. Opposing side wall 90 consists of side wall portions 90A and 90B and intermediate side wall portion 90C. The heights of side wall portions 90A and 90B are greater than intermediate side wall portion 90C thereby creating a middle-notched section of side wall 90. Side wall portions 90A and 90B adjoin end walls 60 and 70 respectively.

The second section 20 has a base having a generally planar outer wall surface 150 and an inner wall surface 160 with one end wall 170. Inner wall surface 160 has opposing side walls 180 and 190 along the side perimeters. Side wall 180 consists of side wall portions 180A and 180B and intermediate side wall portion 180C. The heights of side wall portions 180A and 180B are greater than intermediate side wall portion 180C thereby creating a middle-notched section of side wall 180. Side wall 190 consists of side wall portions 190A and 190B and intermediate side wall portion 190C. The heights of side wall portions 190A and 190B are greater than intermediate side wall portion 190C thereby creating a middle-notched section 1 of side wall 190. Side wall portions 180A and 190A adjoin end wall 170. The width of second section 20 between the outer surfaces of the side walls is dimensionally less than the width of first section 10 between the inner surfaces of the side walls.

A first set of multiple rib flanges 210 are disposed on inner wall surface 160 parallel to side walls 180 and 190. Optionally, a second set of multiple rib flanges 220 may be disposed on inner wall surface 160 parallel to side walls 180 and 190. Rib flanges 210 and 220 may be the same height or different heights. By way of example, the side view in FIG. 8D, shows different sized cavity openings 240 and 250. Rib flanges 210 and 220 are separated by a locking bracket 610 disposed perpendicular between the two sets of rib flanges. Locking bracket 610 has a first prong 620 at one end thereof and a second prong 630 at the opposite end. A first lug 640 projects outwardly from prong 620 and a second lug 650 projects outwardly from prong 630.

Figure 8A:
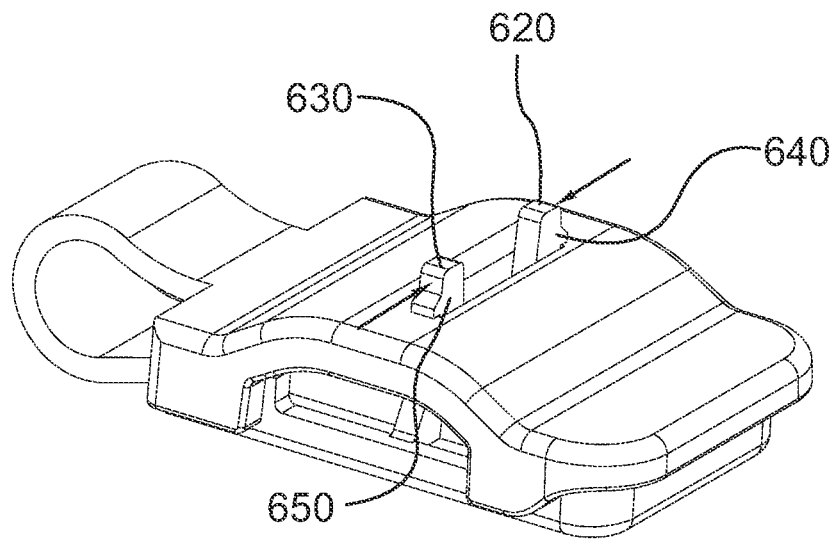
FIG. 8A is a perspective view of another embodiment of a Tracer Wire Holder of the present invention in a closed position.
Figure 8B:
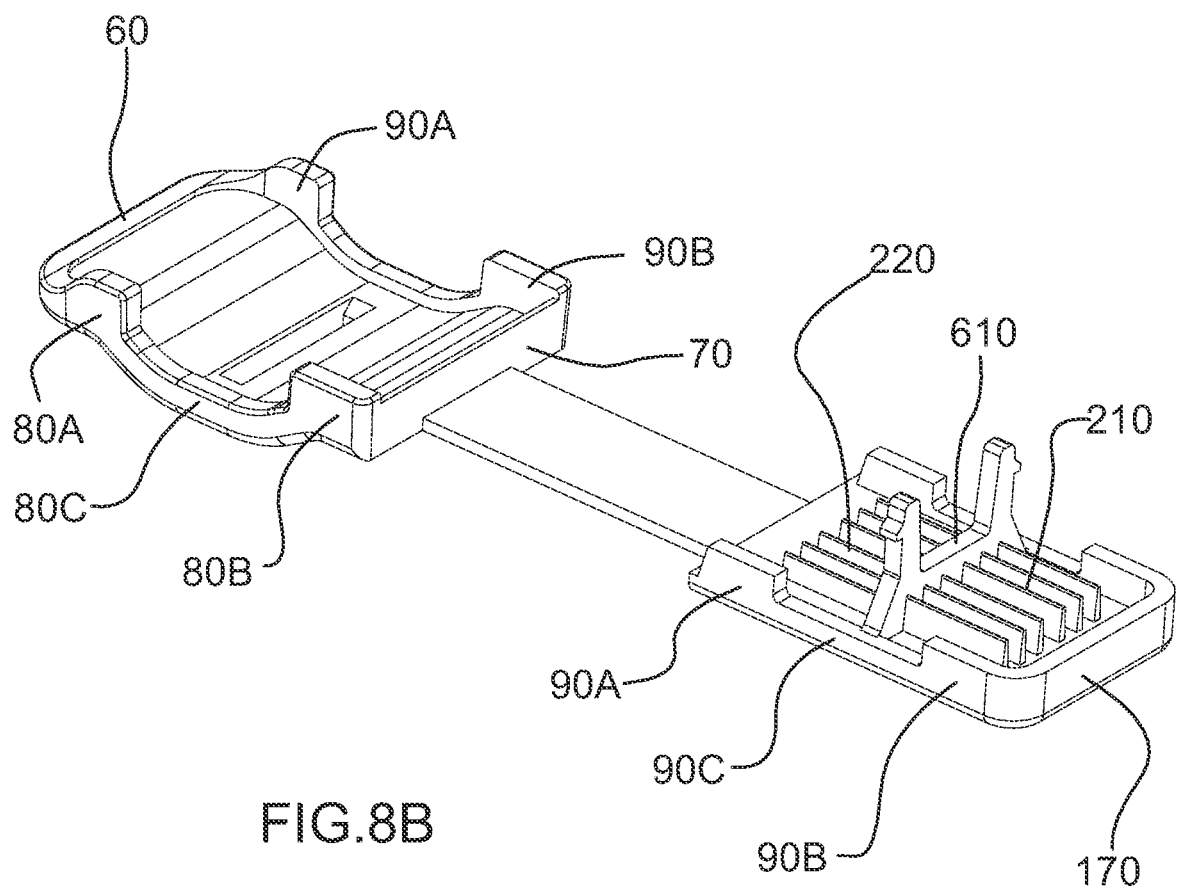
FIGS. 8B and 8C are top and bottom perspective views of the Tracer Wire Holder of FIG. 8A in an open position.
Figure 8C:
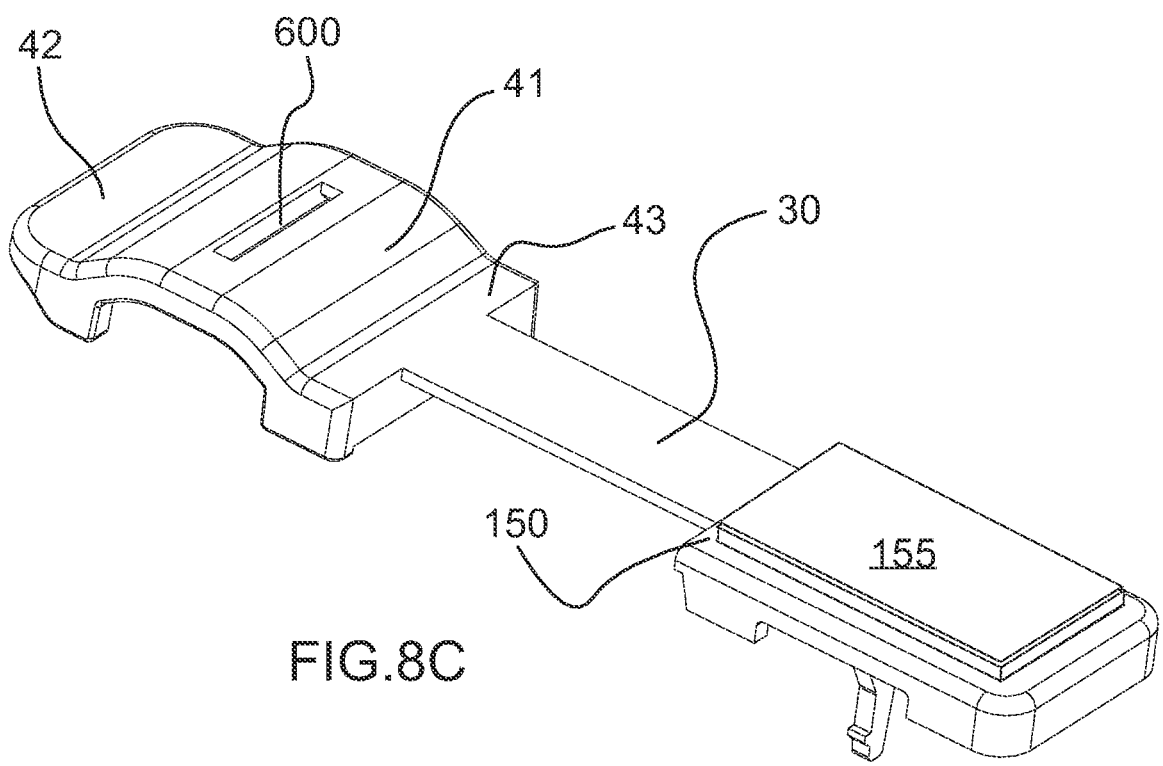
Figure 8D:
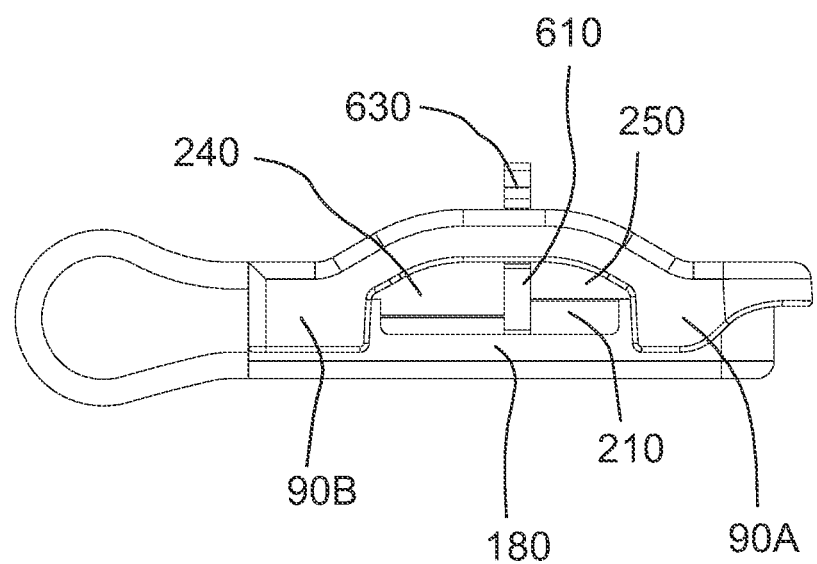
FIG. 8D is a side view of the Tracer Wire Holder of FIG. 8A.

When the tracer wire holder 1 is in a closed locked position as shown in FIGS. 8A and 8D the locking bracket 610 and the rib flanges 210 and 220 position and retain tracer wires [not shown] in place in either or both cavity openings 240 and 250 created by middle notched sections of first section 10, middle notched sections of second section 20, spacer member 230, and end wall 170 of second section 20.

An open tracer wire holder 1 of FIG. 8B is put into a closed locked position shown in FIGS. 8A and 8D by rotationally moving first section 10 over intermediate section and pressing first section 10 onto second section 20. First slotted aperture 600 receives locking bracket 610. As section 10 is pressed onto section 20, lugs 640 and 650 engage middle surface 41, thereby securing first section 10 with second section 20 in a closed position. The locking of the first and second sections secures the tracer wire in place when affixing the tracer wire holder to a pipe.

The closed tracer wire holder 1 with the configurations shown in FIGS. 8A to 8E can be re-opened by pinching prongs 620 and 630 which releases lugs 640 and 650 from engagement with middle portion 41 thereby allowing locking bracket 610 to pass through aperture 600 and releasing first section 10 from second section 20.

As described above, a double cavity area permits a small wire and a larger wire to be secured with one tracer wire holder. This allows a user to use his/her best judgment and common sense in the field to make sure that the wire is placed in the cavity best suited for a secure fit.

Adhesive or a double sided peelable adhesive pad 155 is applied to second section outer wall 150 for easy and quick fastening of the tracer wire holder 1 to a pipe. The double sided peelable adhesive pad may be pre-applied to a tracer wire holder or be applied during installation. An installer may grab 3 or 4 tracer wire holders and affix each one open on a pipe every 2 to 3 meters [or other spacing depending on the municipality specification]. Once the holders are secured to the top centre of the pipe, the tracer wire is placed in each holder, on whichever rib flanges best suits the tracer wire thickness.

Figure 9A:
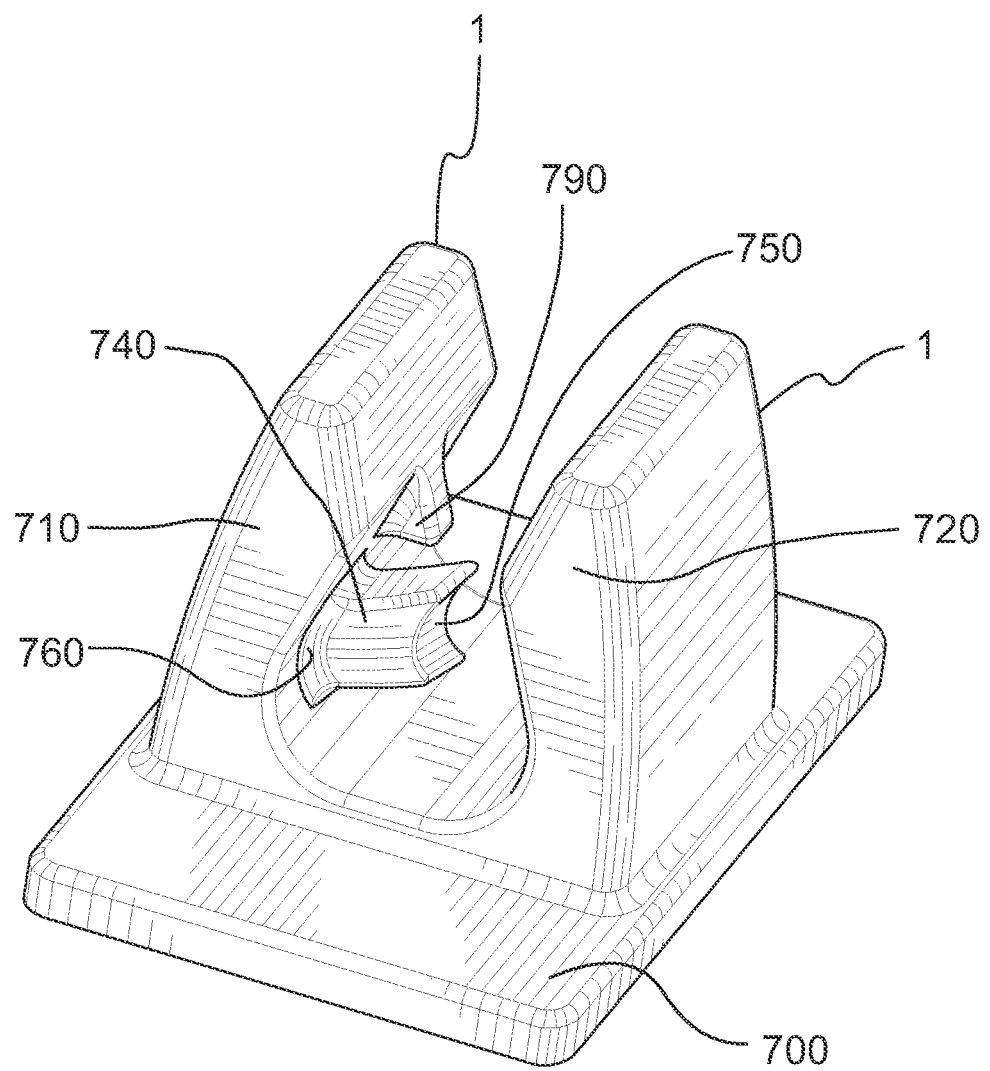
FIG. 9A is a perspective view of another embodiment of a Tracer Wire Holder of the present invention.
Figure 9B:
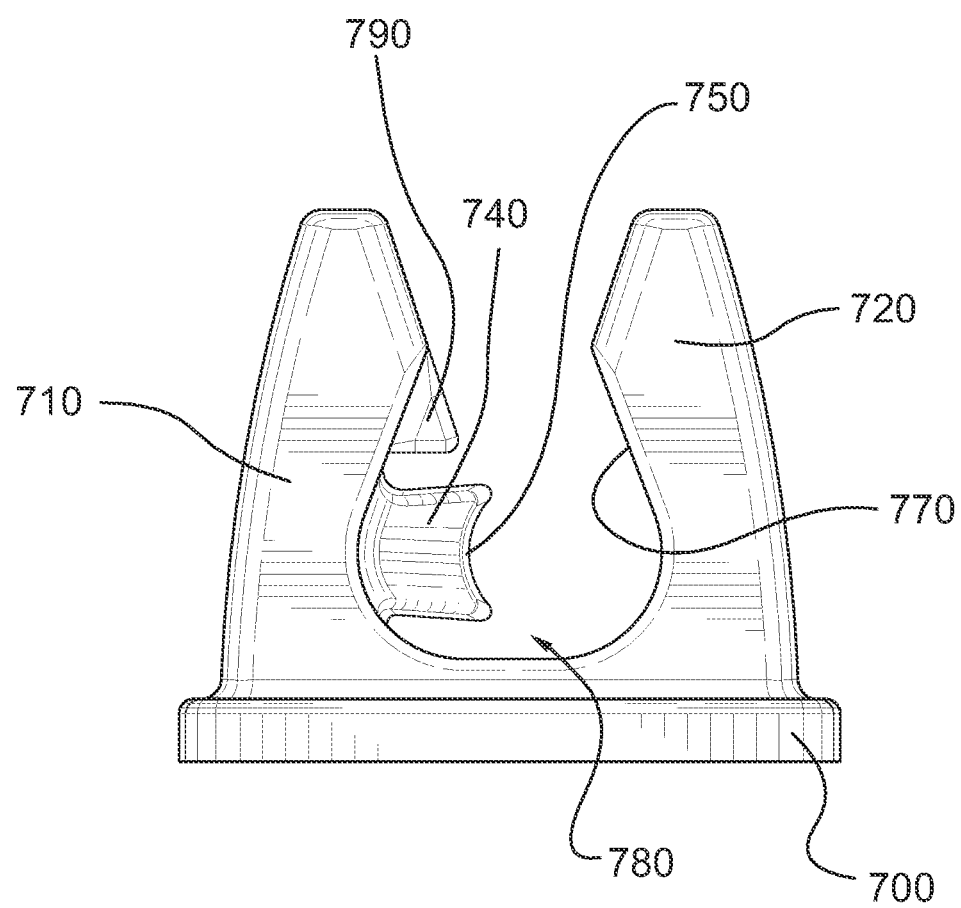
FIG. 9B is an end view of the Tracer Wire Holder of FIG. 9A.

FIGS. 9A and 9B illustrate another exemplary embodiment. The tracer wire holder 1 is comprised of a base a substantially planar base 700, a first section 710 and a second section 720 projecting therefrom to form a horseshoe shaped opening 780. A rib member 740 having a concave end surface 750 projects from the inner wall 760 of one section towards the inner wall 770 of the second section to form a horseshoe shaped cavity 780 for receiving a tracer wire. A lug 790 is disposed above rib member. A tracer wire 800 is placed into cavity 780 and secured in place by the rib member 740 and second section inner wall 770. If the tracer wire needs to be removed, a screwdriver head is inserted from the top of the tracer wire holder into the space between lug 790 and the rib member 740 and pressed against the top of second section 710, to move it and thereby release the wire from the cavity.

The rib member 740 retains the wire when it is pressed in from the top of the holder. Once the wire is installed it can be pulled tight in the direction of installation without having the slack pulled back. Once secure on a pipe, the tracer wire holder's rib member 740 only allows for the wire to be pulled in one direction only, which is advantageous once the pipe bedding process takes place.

Figure 10:
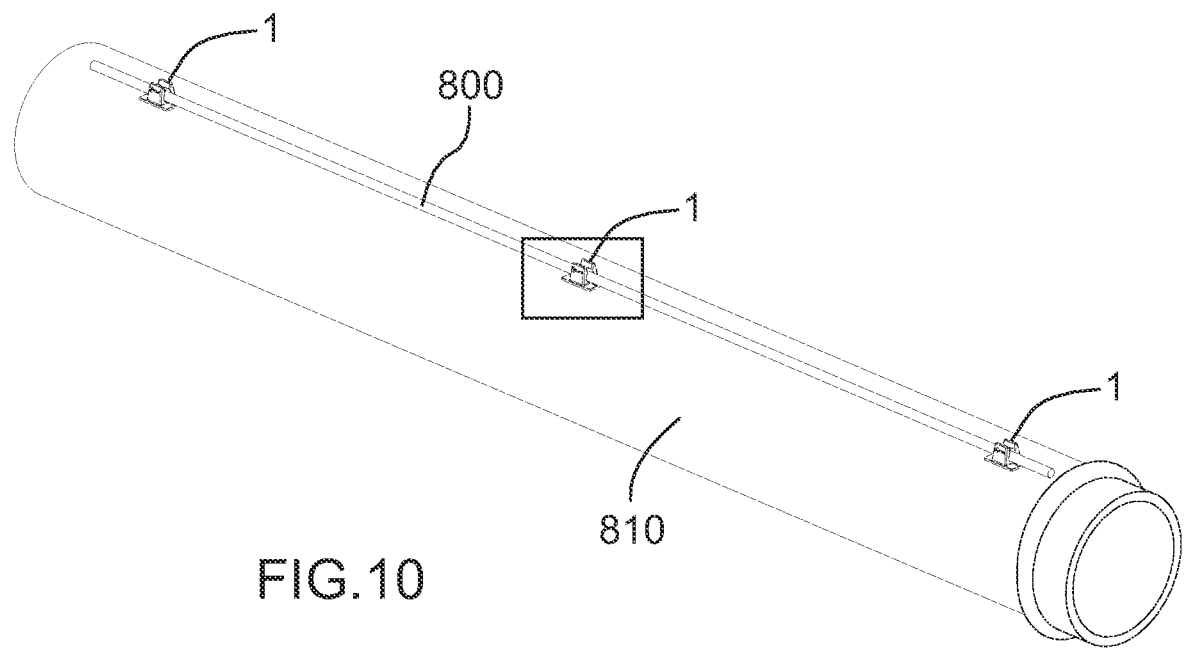
FIG. 10 shows Tracer Wire Holders affixed to a pipe section with a tracer wire held by tracer wire holders.

FIG. 10 shows tracer wire holders of the embodiment of FIGS. 9A and B affixed to a pipe section 810 with a tracer wire 800 secured by spaced apart tracer wire holders. The other tracer wire embodiments described above would similarly be positioned and affixed to a pipe section holding a tracer wire.

Figure 11:
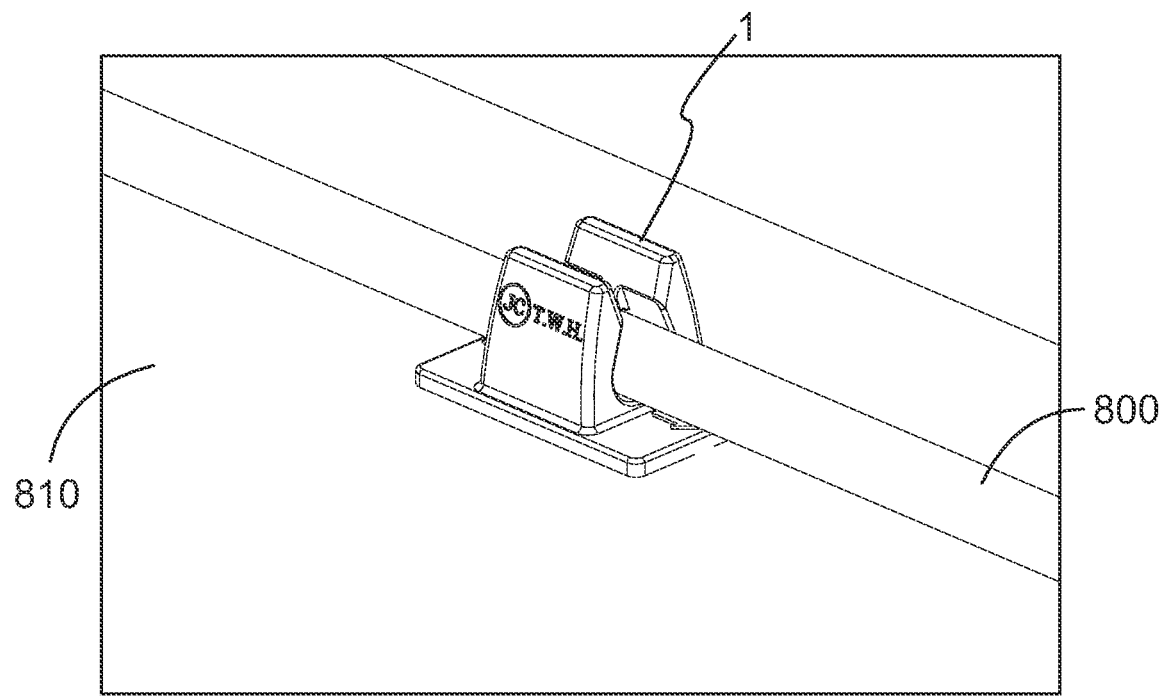
FIG. 11 is a close-up view a tracer wire holder of FIG. 10 holding the tracer wire.

FIG. 11 is a close-up view of the tracer wire holder of FIG. 10 holding a tracer wire 800 on a pipe section 810.

Figure 12:
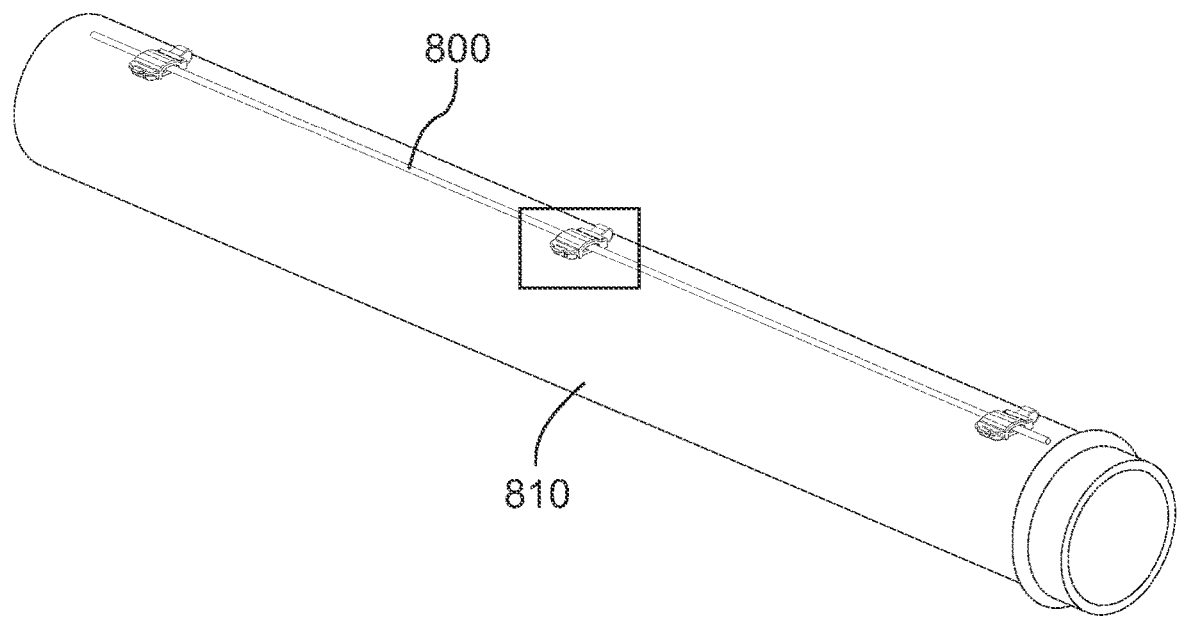
FIG. 12 shows tracer wire holders of FIG. 1 affixed to a pipe section with a tracer wire held by tracer wire holders.

FIG. 12 shows tracer wire holders of the embodiment of FIG. 1 affixed to a pipe section 810 with a tracer wire 800 secured by spaced apart tracer wire holders. The other tracer wire embodiments described above would similarly be positioned and affixed to a pipe section holding a tracer wire.

Figure 13:
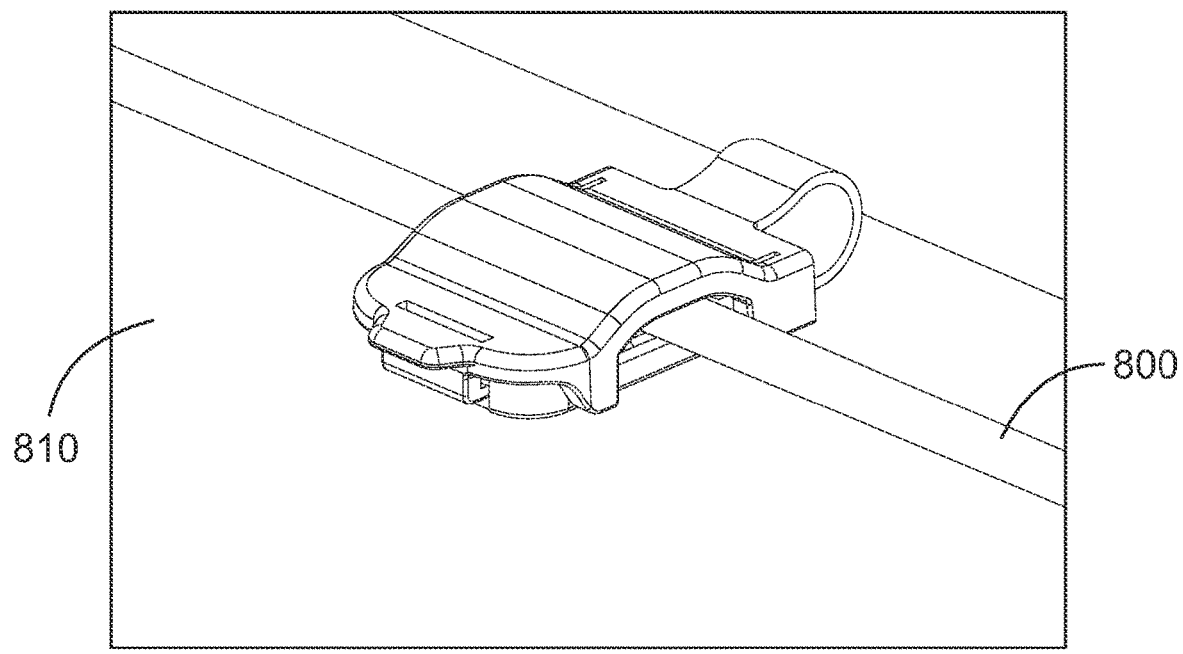
FIG. 13 is a close-up view a tracer wire holder of FIG. 1 holding the tracer wire.

FIG. 13 is a close-up view of the tracer wire holder of FIG. 1 holding a tracer wire 800 on a pipe section 810.

The tracer wire holder may be made of plastic including low density polyethylene (LDPE), a flexible and strong plastic that withstands the various conditions it will face when buried in different spoil conditions.

While the principles of the invention have been shown and described in connection with specific embodiments, it is to be understood that such embodiments are by way of example and are not limiting. As is evident from the foregoing description, certain aspects of the present invention are not limited by the details of the tracer wire holder illustrated in the drawings. Other modifications and applications, or equivalents, will occur to those skilled in the art. The terms "having", "comprising" and "including" and similar terms as used in the foregoing specification are used in the sense of "optional" or "may include" and not as "required". Many changes, modifications, variations and other uses and applications of the present construction will, however, become apparent to those skilled in the art after considering the specification and attached drawings. All such changes, modifications, variations and other uses and applications which do not depart from the spirit and scope of the invention are deemed to be covered by the invention which is limited only by the claims that follow. The scope of the disclosure is not intended to be limited to the embodiments shown herein but is to be accorded the full scope consistent with the claims, wherein reference to an element in the singular is not intended to mean "one and only one" unless specifically so stated, but rather one or more.

The invention claimed is:

1. A tracer wire holder comprising:
    a first section having a base, two side walls and first and second end walls, each of the two side walls of the first section having an inner surface and an outer surface;
    a second section having a base, a first end wall, and two side walls, each of the two side walls of the second section having an inner surface and an outer surface, said first and second sections being connected by a pliable intermediate section;
    wherein a distance between the outer surfaces of the second section side walls is less than a distance between the inner surfaces of the first section side walls;
    locking means to releasably secure the first section with the second section; and
    wherein the engaged first and second sections form at least one cavity for receiving and securing a tracer wire while allowing an entirety of the tracer wire to extend therethrough.

2. The tracer wire holder of claim 1, wherein the first and second section side walls each have middle notched sections.

3. The tracer wire holder of claim 1, wherein the first section base has generally arcuate outer and inner surfaces and the second section base has generally planar outer and inner surfaces.

4. The tracer wire holder of claim 1, wherein one or more rib flanges are positioned on the second section base in parallel arrangement to the second section side walls.

5. The tracer wire holder of claim 4 wherein a second set of one or more rib flanges is positioned on the second section base in parallel arrangement to the second section side walls and wherein the sets of rib flanges are separated by a spacer member disposed on the second section base perpendicular to and between the two sets of rib flanges.

6. The tracer wire holder of claim 5 wherein the two sets of rib flanges are different heights.

7. The tracer wire holder of claim 1, wherein the locking means comprises:
    a locking bracket projecting from the first end wall of the first section and disposed adjacent a slotted aperture in the first section base, said locking bracket having an outwardly extended tab at a first end of the bracket and an inwardly extended flange hook at a second end of the bracket;
    a longitudinal recessed portion disposed on an outside edge of the first end wall of the second section cooperatively receiving and releasably securing said flange hook; and
    first and second flanges on the inner surfaces of first section side walls positioned proximate the second end wall of said first section in locking engagement with first and second flange members disposed on the outer surfaces of second section side walls proximate the intermediate section.

8. The tracer wire holder of claim 1, wherein the first section base further comprises a first slotted aperture proximate the first end wall thereof and a second slotted aperture proximate the second end wall thereof, and the locking means comprises:
   a first locking bracket having an outwardly extended flange hook at an upper end thereof projecting upwards from a centre portion of the first end wall of the second section, the said flange hook engaging in releasably locking engagement with the first section base through the first slotted aperture; and
   a second locking bracket projecting from the second section base opposite the first end wall proximate the intermediate section, the said second locking bracket engaging in releasably locking engagement with the first section base through the second slotted aperture.

9. The tracer wire holder of claim 1, wherein the second section further comprises a second end wall, and the locking means comprises:
   a locking bracket projecting proximate the first end wall of the first section and disposed adjacent a slotted aperture in the first section base, said locking bracket having an outwardly extended tab at a first end of the bracket and an inwardly extended flange hook at a second end of the bracket;
   a longitudinal recessed portion disposed on an outside edge of the first end wall of the second section cooperatively receiving and releasably securing said flange hook; and
   lugs projecting towards the intermediate section at each end of the second end wall of the first section base and the second end wall of the second section base configured with an aperture at each end thereof for receiving said lugs in releasably locking engagement.

10. The tracer wire holder of claim 1, wherein the locking means comprises:
    a T shaped locking bracket with first and second tabs projecting upwards from a centre portion of the first end wall of the first section, said locking bracket disposed adjacent a slotted aperture in the first section base; and
    a longitudinal recessed portion disposed on an outside edge of the first end wall of the second section cooperatively receiving and releasably securing said second tab in locking arrangement;
    first and second flanges on the inner surfaces of first section side walls positioned proximate the second end wall of said first section in releasably locking engagement with first and second flange members disposed on outer surfaces of second section side walls proximate the intermediate section.

11. The tracer wire holder of claim 1, wherein the locking means comprises:
    a locking bracket centrally disposed perpendicular to the side walls of the second section base, said locking bracket having a first prong at one end thereof and a second prong at an opposite end, a first lug projecting outwardly from the first prong and a second lug projecting outwardly from the second prong; and
    a slotted aperture on the first section base centrally positioned to receive the locking bracket therethrough and enabling the lugs to engage with said first section base in releasably locking arrangement.

12. The tracer wire holder of claim 1, further comprising a double sided peelable adhesive pad applied to an underside surface of the second section base.

* * * * *